United States Patent
Kitamura

(10) Patent No.: US 6,683,424 B2
(45) Date of Patent: Jan. 27, 2004

(54) DISTORTION CORRECTING CIRCUIT AND DISPLAY DEVICE

(75) Inventor: Masahiro Kitamura, Kanagawa (JP)

(73) Assignee: NEC Electronics Corporation (JP)

(*) Notice: Subject to any disclaimer, the term of this patent is extended or adjusted under 35 U.S.C. 154(b) by 40 days.

(21) Appl. No.: 10/002,565

(22) Filed: Nov. 1, 2001

(65) Prior Publication Data

US 2002/0057063 A1 May 16, 2002

(30) Foreign Application Priority Data

Nov. 10, 2000 (JP) ........................... 2000-343983

(51) Int. Cl.[7] ................................................. G09G 1/04
(52) U.S. Cl. ........................................ 315/382; 315/371
(58) Field of Search ............................. 315/364, 368.12, 315/368.18, 370, 371, 399, 380–382, 382.1

(56) References Cited

U.S. PATENT DOCUMENTS 5,449,982 A * 9/1995 Ando ........................... 315/371
6,078,151 A * 6/2000 Kudo ........................... 315/382

FOREIGN PATENT DOCUMENTS

| JP | A-5-308538 | 11/1993 |
| JP | A-6-334887 | 12/1994 |
| JP | A-11-313222 | 11/1999 |

* cited by examiner

*Primary Examiner*—Wilson Lee
(74) *Attorney, Agent, or Firm*—Scully, Scott, Murphy & Presser

(57) ABSTRACT

A distortion correcting circuit for correcting vertically asymmetric distortion while achieving reduction in circuit scale and a display apparatus equipped with the circuit are provided. This distortion correcting circuit comprises a comparator circuit 10 which compares an amplitude of an vertical sawtooth wave Vsaw with a reference level Vref which is set to the amplitude of the vertical sawtooth wave corresponding to a center of the screen in a vertical sweeping direction, a multiplier circuit 11 which generates a parabolic wave of the difference between the vertical sawtooth wave and the reference level, a variable gain type amplifier circuit 12 which adjusts the output amplitude of the multiplier circuit 11 and a control circuit 13 which sets a first and second gains of the variable gain type amplifier circuit 12 based upon a result of the comparison in said comparator circuit when a result of the comparison in the comparator circuit 10 represents that the amplitude of the vertical sawtooth wave is lower, and equal to or higher than the reference level, respectively. A distortion correction signal Vsaw is output from the amplifier circuit 12.

16 Claims, 18 Drawing Sheets

SCANNING INTERVAL

CENTER OF SCREEN = CENTER OF SAWTOOTH WAVE

BLANKING INTERVAL

FIG. 10a 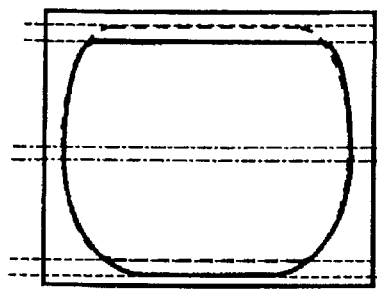 FIG. 10b 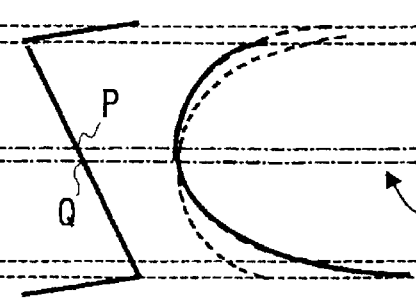 FIG. 10c
← CENTER OF SCREEN
≠ CENTER OF SAWTOOTH WAVE
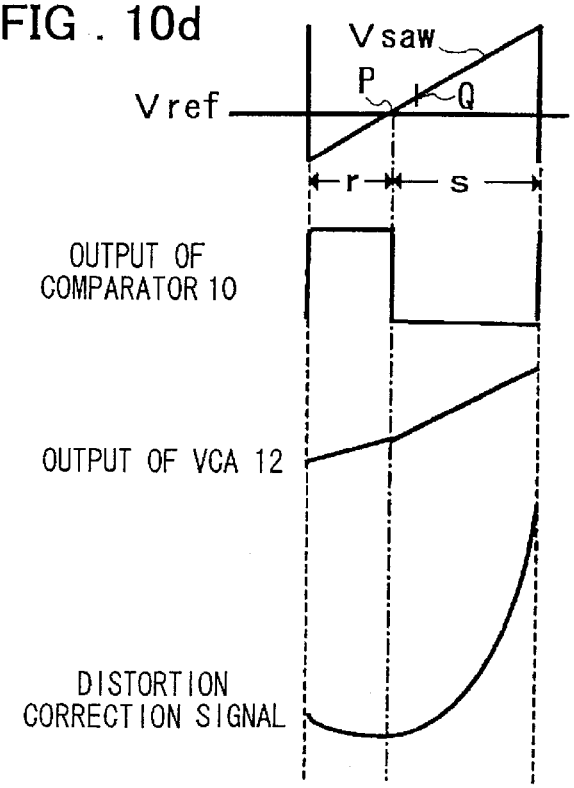
FIG. 10d

REFERECNE CASE
(PRIOR ART)

REFERECNE CASE
(PRIOR ART)

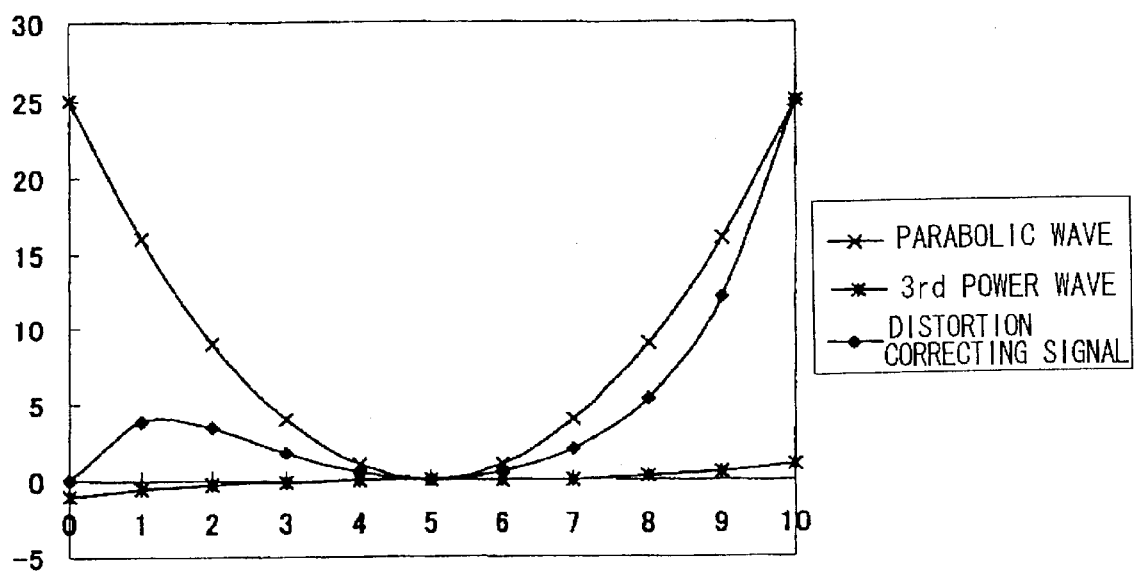
FIG. 13    REFERECNE CASE
(PRIOR ART)

VIDEO IMAGE
↓

PINCUSHION →
DISTORTION

HORIZONTAL
DEFLECTION CURRENT
↓

DISTORTION
CORRECTING →
SIGNAL

AFTER CORRECTION
OF DISTORTION →

REFERECNE CASE
(PRIOR ART)
VIDEO IMAGE
↓

PINCUSHION DISTORTION →

REFERECNE CASE
(PRIOR ART)

DISTORTION CORRECTING SIGNAL →

REFERECNE CASE
(PRIOR ART)

AFTER CORRECTION OF DISTORTION →

REFERECNE CASE
(PRIOR ART)
HORIZONTAL DEFLECTION CURRENT
↓

REFERECNE CASE
(PRIOR ART)

REFERECNE CASE
(PRIOR ART)

VERTICAL PERIOD

SIDE VIEW

FRONT VIEW

DISTORTION CORRECTING CIRCUIT AND DISPLAY DEVICE

FIELD OF THE INVENTION

The present invention relates to a display apparatus and in particular to a circuit for correcting pincushion distortion and a display device comprising the circuit.

BACKGROUND OF THE INVENTION

In a cathode ray tube (termed "CRT") of a Television receiver or display apparatus, as shown in FIG. 16a, while a deflection radius of a uniform magnetic field for deflecting an electron beam 73 emitted from an electron gun (cathode electrode 72) defines a spherical face, a screen (fluorescent surface) 74 is substantially planer so that the distance from the deflection center to the screen gets longer with the increase of the deflection angle and the projection size becomes larger as a raster image projected on the screen 74 moves toward the edges of the screen 74. The raster image are extended most at the four corners where the deflection angle becomes the largest and are distorted in the form of a pincushion and hence this distortion is termed "pincushion distortion". As shown in FIG. 16b, the distortion in which the vertical line at opposing right and left edges on the screen are curved is referred to as "E-W Raster pincushion distortion" or "Side pincushion distortion" since it is the distortion at the right and left edges.

Correction of the left and right pincushion distortion has heretofore been achieved by causing a horizontal deflection current which is amplitude-modulated with a parabolic current in a vertical scanning period to flow through a horizontal deflection coil.

FIG. 17 is a block diagram showing an exemplary configuration of a CRT monitor in which a deflection distortion such as a side pincushion distortion is corrected. Referring to FIG. 17, the CRT monitor comprises a vertical sawtooth wave oscillating circuit 207 which receives a vertical synchronization signal Vsync output from a synchronization separating/synchronization input processing circuit 205 and generates a vertical sweeping sawtooth wave (termed vertical sawtooth wave) and a deflection distortion correcting circuit 208 which receives the vertical sawtooth wave output from the vertical sawtooth oscillating circuit 207 and generates a distortion correction signal Vo made up of a parabolic wave of one vertical sweeping period. The distortion correction signal Vo which is generated by the deflection distortion correcting circuit 208 is fed to a horizontal oscillating circuit 206 which receives a horizontal synchronization signal Hsync and generates a horizontal sweeping sawtooth wave (horizontal drive signal). The horizontal drive signal (the phase of which is controlled by the distortion correction signal) which is output from the horizontal oscillating circuit 206 is fed to a horizontal deflection output circuit 210. The horizontal drive signal output from the horizontal oscillation circuit 206 and the distortion correction signal Vo output from the deflection distortion correction circuit 208 are fed to a +B power supply circuit 209 which boosts the +B voltage by a pulse amplification in a blanking period during which a high voltage is required. As is well known, one cycle of the sawtooth wave is made up of a scanning interval during which the electron beam is scanned at a constant rate and a blanking interval which is a period from the completion of the scanning in one direction to next scanning. The amplitude of the horizontal drive signal within one vertical period is corrected by correcting +B voltage with the distortion correction signal Vo, a frequency of which corresponds to one vertical period. The +B voltage is supplied by the +B power supply circuit 209 to the horizontal deflection output circuit 210 which provides a deflection current which flows into a horizontal deflection coil. The horizontal deflecting current in which the amplitude of the horizontal drive signal is changed in proportion with that of the distortion correction signal is output from the horizontal deflection output circuit 210. The synchronization deflection circuit is configured as mentioned above. As an output circuit of a video signal (RGB signal), there exists an RGB preamplifier 201 which receives a input video signal (RGB input) and outputs pre-amplified signal to an RGB main amplifier 202. The amplified output signal from the RGB main amplifier 202 is fed to an electron gun (not shown) of the CRT 203. In the CRT 203, deflection currents from horizontal and vertical deflection output circuits 210 and 211 are supplied to the horizontal and vertical deflection coils 204, respectively and the electron beam which is emitted from the electron gun is deflected under the magnetic fields from deflection yokes (not shown) arranged on the neck of the CRT 203.

A slight variation in a mounting angle of the deflection yoke on the neck of the CRT 203 in a vertical direction causes a difference in a distortion wave form of a pincushion distortion, trapezoidal distortion and the like between the upper and lower areas of the screen, and hence a vertically asymmetrical distortion is generated.

Although the raster images at the upper and lower areas of the screen of the CRT have been corrected by the same amount so that the distortions are not readily visible, implementation of a feature to independently correct the side pincushion distortion at upper and lower areas of the screen has been demanded with a recent increase in a size and a planar structure of the screen of CRT.

Apparatuses for correcting the side pincushion distortion or vertically asymmetric distortion are disclosed in, for example, Japanese Patent Kokai Publication JP-A-6-334887, JP-A-5-308538 and JP-A-11-313222.

Among of them, in JP-A-6-334887 is disclosed a configuration of a corner pincushion distortion correcting wave generating circuit which is capable of independently correcting the distortions at corners in the upper and lower levels of the screen. As shown in FIG. 18, the correcting wave generating circuit comprises a lower corner part extracting differential comparator circuit 102 which receives a sawtooth wave signal 101 (vertical sawtooth wave signal) having a period of one vertical interval and extracts (slices) a part of the waveform corresponding to the lower area of the screen in the sawtooth wave signal 101; a multiplier circuit 105 for multiplying the extracted waveform; and an amplitude adjusting circuit (gain control circuit) 107 for adjusting the amplitude of the corrected wave, whereby the above-mentioned circuits correct the corner distortion in the lower area of the screen. The correction wave generating circuit further comprises an upper corner part extracting differential comparator circuit 103 which receives the sawtooth wave signal 101 and extracts a part of the waveform corresponding to the upper area of the screen in the sawtooth wave signal 101; a multiplier circuit 106 for multiplying the extracted waveform; and an amplitude adjusting circuit (gain control circuit) 108 for adjusting the amplitude of the corrected wave, whereby the circuits correct the corner distortion at the upper area of the screen. The correcting wave generating circuit further includes an amplitude adjusting circuit (gain control circuit) for adjusting the amplitude of the signal after the lower corrected wave is added to the upper corrected wave in an adder 109. A corner slice point bias circuit 104 provides reference bias voltages used in the lower and upper corner image extracting differential comparator circuits 102 and 103 respectively for extracting the lower and upper corner parts in images to the lower and upper corner extracting differential comparator circuits 102 and 103, respectively.

In JP-A-5-308538 is disclosed a left and right side pincushion distortion correcting apparatus for correcting the side pincushion distortion wherein a current flowing through the horizontal deflection coil of a horizontal output circuit is modulated in a vertical period by a parabolic voltage generated by integrating the vertical sawtooth wave voltage and wherein the apparatus comprises a correction section set up unit for forming a selection signal for each correction section which is obtained by dividing each of a vertical synchronization period with reference to the vertical synchronization signal or horizontal synchronization signal and a correction quantity adjusting unit which selects a correction adjusting voltage for each correction section in response to a selection signal of each correction section for superimposing the correction adjusting voltage of each correction section to the parabolic wave voltage. With this apparatus, the correction section is obtained by dividing the vertical synchronization period, the correction quantity adjusting voltage is given to each section, the correction quantity adjusting voltage in each correction section is put on the parabolic voltage, and parabolic wave voltage is generated at an integration circuit by integrating the vertical sawtooth wave voltage so that the central position of the amplitude of the vertical sawtooth wave matches the bottom of the parabolic wave voltage and the correction interval is preset with reference to the vertical synchronization signal and the correction section is set up with reference to the vertical synchronization signal.

In JP-A-11-313222, is disclosed an image distortion correcting apparatus which reduces distortion which is asymmetric in upper and lower parts of a screen. With this apparatus, an output of the side pin correcting circuit is a parabolic wave plus a third power wave (S-shape wave). The amplitude of the parabolic wave of the output signal is changed by varying a side pin control voltage, and hence a pincushion distortion which is symmetric in left and right sides of the screen can be corrected. The amplitude of the third power wave is changed by varying an S-shape distortion control voltage, and hence vertical S-shape distortion which is asymmetric in upper and lower parts of a screen can be corrected. The correction quantity in the third power wave is automatically changed depending upon the vertical size of the screen and vertical position by using a vertical sawtooth wave including information on the vertical size of the screen and the vertical position. With this apparatus, the distortion adjustment operation is complicated because the operation adjusts two signals (the parabolic wave and the 3rd power wave) for the distortion of the whole screen to be minimized.

SUMMARY OF THE DISCLOSURE

As mentioned in the above, the apparatus which is disclosed in JP-A-6-334887 has two systems each comprising a differential comparator circuit, multiplier circuit and amplitude adjusting circuit for each of the upper and lower parts of a screen in order to control independently the upper and lower parts of the screen. Accordingly, the apparatus has a problem that the circuit scale increases. Parts in a vertical sawtooth wave corresponding to a lower part (lower corner) and an upper part (upper corner) of the screen are respec-tively extracted by the differential comparator circuits 102 and 103 and are respectively multiplied by the multiplier circuits 105 and 106. If there are variations in the offsets of two differential comparator circuits 102 and 103, the variations in the offsets are also multiplied by the multiplier circuits 105 and 106. The correction signal which is obtained by adding the lower waveform to the upper waveform may have an offset (step) due to the difference between the offsets in the upper and lower adjusting circuits. When the gains of two amplitude adjusting circuits 107 and 108 are changed, the offset voltage are changed, which may change the raster image size.

It is an object of the present invention to provide a distortion correcting circuit and a display apparatus in which a distortion is individually corrected for each one in the upper and lower parts of a screen while reducing a circuit scale.

Another object of the present invention is to provide a distortion correcting circuit and a display apparatus which is capable of correcting properly distortions in a lower and upper areas of a screen which are asymmetric even when a center of a vertical sawtooth wave does not correspond to a center of the screen.

At least one of the above mentioned objects is accomplished by a distortion correcting circuit in accordance with one aspect of the present invention which comprises: comparing means for comparing an amplitude of a sawtooth wave signal used for a vertical sweep (termed "vertical sawtooth wave") with one predetermined reference level or a plurality of predetermined reference levels to detect which part of a screen in a vertical sweeping direction a currently sweeping position is located; amplifying means for adjusting an amplitude of a side pincushion distortion correction signal generated from said vertical sawtooth wave; and control means for individually setting a gain for each of partial regions of the screen to said amplifying means on the basis of a detection result by said comparing means.

In accordance with another aspect of the present invention is provided a distortion correcting circuit-comprising comparing means for comparing an amplitude of a vertical sawtooth wave with a predetermined reference level to detect which of an upper and lower areas of a screen a current sweeping position is located at; and control means for individually setting for the upper and lower areas of the screen the gain of amplifying means which amplifies the amplitude of a side pincushion distortion correction signal generated from said vertical sawtooth wave based upon a result of the detection conducted by said comparing means.

More specifically, a distortion correcting circuit in accordance with another aspect of the present invention comprises: a comparator circuit which receives a sawtooth wave signal used for a vertical sweep (termed "vertical sawtooth wave") and compares an amplitude of said vertical sawtooth wave in a scanning period with one reference level or a plurality of different reference levels, each of which is set respectively to an amplitude value of the vertical sawtooth wave corresponding to each predetermined position of the screen in a vertical sweeping direction; a variable gain type amplifier circuit which adjusts an amplitude of an output signal from a multiplier circuit for generating a parabolic wave; and a control circuit which alternatively selects one of a plurality of gains to provide the selected gain to said variable gain type amplifier circuit on the basis of a comparison result by said comparator circuit depending upon which of regions divided by said reference level the amplitude of said vertical sawtooth wave is located, wherein a distortion correction signal is output from said variable gain type amplifier circuit.

A distortion correcting circuit in accordance with another aspect of the present invention comprises: a comparator circuit which receives a sawtooth wave signal used for a vertical sweep (termed "vertical sawtooth wave") and compares the voltage of said vertical sawtooth wave in a scanning period with a reference level or a plurality of reference levels, each of which is set to an amplitude of the vertical sawtooth wave corresponding to a predetermined vertical position of a screen; a variable gain type amplifier circuit which amplifies said vertical sawtooth wave; a control circuit which selects one of plurality of predetermined gains depending upon which of regions divided by said reference level the amplitude of said vertical sawtooth wave is located on the basis of a comparison result by said comparator circuit and provides the gain selected to the variable gain type amplifier circuit; and a multiplier circuit which generates a parabolic wave from an output signal output from said variable gain type amplifier circuit to output said parabolic wave as a distortion correction signal Still other objects and advantages of the present invention will become readily apparent to those skilled in this art from the following detailed description, wherein only the preferred embodiment of the invention is shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 10a to 10d are views for explaining the principle of the operation of the embodiment of the present invention;

FIG. 13 is a graph for explaining the distortion correction signal in another prior art as a reference case;

PREFERRED EMBODIMENTS OF THE INVENTION

The embodiments of the present invention are now described in the below. In the present invention, a partial area in which a current sweeping position is located is detected by comparing an amplitude of a vertical sawtooth wave with one reference level or a plurality of reference levels while a plurality of partial areas (such as an upper and lower parts) are sectioned and located along a vertical sweeping direction on the screen, and an amplitude of the distortion correction signal is individually controlled for each of the partial areas on the screen by variably controlling a gain of an amplifier circuit which adjusts the amplitude of a left and right pincushion distortion (termed side pincushion distortion) correction signal (parabolic wave) for each of the partial areas of the screen on the basis of the detection result. The apparatus is configured so that the amplitude of the side pincushion distortion correction signal is smoothly continued between the partial areas of the screen without any noticeable step. For example, the amplitude of the side pincushion distortion correction signal is smoothly continued at the center of the screen in case of partial areas being made up of the upper and lower areas of the screen.

Figure 1:
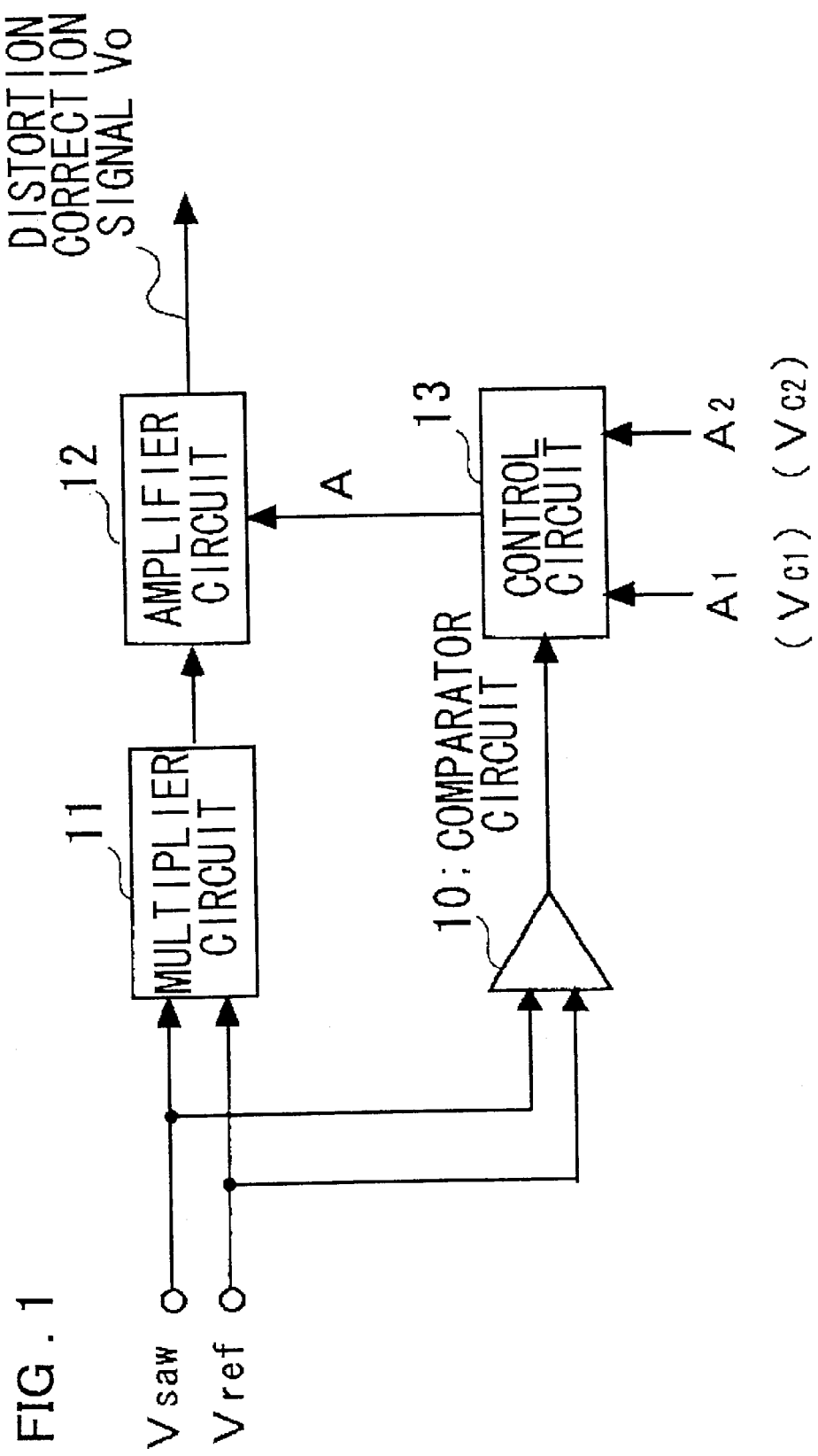
FIG. 1 is a diagram showing the configuration of the first embodiment of the present invention.

Referring to FIG. 1, a distortion correcting circuit in accordance with an embodiment of the present invention comprises a comparator circuit 10 which receives as an input a vertical sawtooth wave and compares an amplitude of the vertical sawtooth wave (the amplitude of the vertical sawtooth wave in a scanning period) with a reference level which is set to an amplitude of the vertical sawtooth wave corresponding to a center position of the screen along a vertical sweeping direction. If the voltage amplitude of the vertical sawtooth wave are to be compared, the reference voltage Vref is provided to the comparator circuit 10 as the reference level. The distortion correcting circuit further comprises a multiplier circuit 11 which receives vertical sawtooth wave and the reference level and generates a parabolic wave of a difference between the input vertical sawtooth wave and the reference level, a variable gain amplifier 12 which adjusts an output amplitude of the multiplier circuit 11 and a control circuit 13 which provides, based on the comparison result by the comparator circuit 10, a first gain A1 to the variable gain type amplifier circuit 12 when a comparison result by the comparator circuit 10 indicates that the amplitude of the vertical sawtooth wave is lower than the reference level and a second gain A2 to the variable gain type amplifier circuit 12 when a comparison result by the comparator circuit 10 indicates that the amplitude of the vertical sawtooth wave is higher than or equal to the reference level. A distortion correction signal Vo is output from an output terminal of the amplifier circuit 12.

Figure 2:
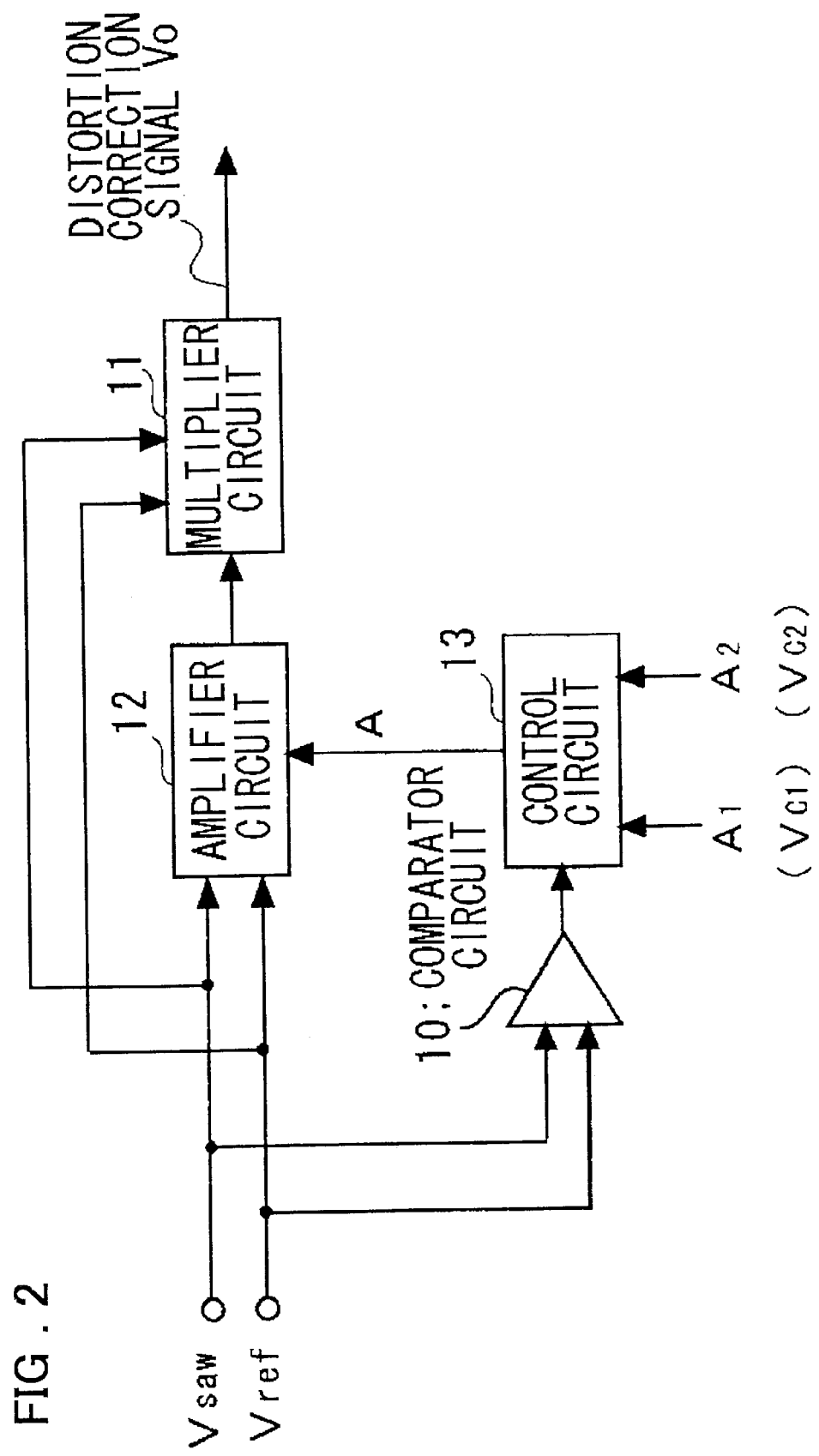
FIG. 2 is a diagram showing the configuration of the second embodiment of the present invention.

Referring now to FIG. 2, a distortion correcting circuit in accordance with another embodiment of the present invention comprises a comparator circuit 10 which compares an amplitude of the vertical sawtooth wave signal with a reference level which is set to the amplitude of the vertical sawtooth wave corresponding to a center of the screen in a vertical sweeping direction, a variable gain amplifier circuit 12 which amplifies a difference between the vertical sawtooth wave and the reference level, a control circuit 13 which selects and provides, based on the comparison result by the comparator circuit 10, a first gain to the variable gain type amplifier 12 when the amplitude of the vertical sawtooth wave is lower than the reference level and selects and provides a second gain to the variable gain type amplifier 12 when the amplitude of the vertical sawtooth wave is higher than or equal to the reference level, a multiplier circuit 11 which generates a parabolic wave from the output from the variable gain amplifier circuit 12 and the difference between the vertical sawtooth and the reference voltage and outputs it as a distortion correction signal Vo.

The embodiments of the present invention will be described in detail with reference to drawings. FIG. 1 illustrates a schematic diagram of a distortion correcting circuit in accordance with a first embodiment of the present invention. Referring to FIG. 1, the distortion correcting circuit of the first embodiment of the present invention comprises a comparator circuit 10 which receives as an input a vertical sawtooth wave Vsaw generated by the sawtooth wave generating circuit of the vertical output unit (not shown) and compares the voltage of the vertical sawtooth wave in a scanning period with a reference voltage Vref which is set to the voltage of the vertical sawtooth wave corresponding to a center position of the screen in a vertical sweeping direction, a multiplier circuit 11 which receives the vertical sawtooth wave Vsaw and reference voltage Vref and generates a parabolic wave of the difference between the vertical sawtooth wave Vsaw and the reference voltage Vref (Vsaw−Vref), a variable gain type amplifier circuit 12 which adjusts an amplitude of the output of the multiplier circuit 11, and a control circuit 13 which receives a comparison result by the comparator circuit 10 as a selection control signal and sets the gain of the amplifier circuit 12 to a first gain A1 when the voltage of the vertical sawtooth wave is lower than the reference voltage Vref, and to a second gain A2 when the voltage of the vertical sawtooth wave is equal to or higher than the reference voltage Vref, respectively. A distortion correction signal Vo having a period equal to one vertical period is output from the output terminal of the amplifier circuit 12. The amplitude of the distortion correction signal Vo is adjusted by the amplifier circuit 12 with gains which are different at a first half and a latter half intervals of one vertical period.

The amplifier circuit 12 which adjusts the amplitude of the output of the multiplier circuit 11 is comprised of a voltage controlled amplifier, the gain of which is varied based on a control voltage which is fed to the amplifier circuit 12. In this case, the control circuit 13 selects a control voltage Vc1 corresponding to the first gain A1 and a control voltage Vc2 corresponding to the second gain A2 on the basis of a comparison result by the comparator circuit 10 and provides the selected control voltage to the voltage controlled amplifier circuit 12.

The reference voltage Vref which is fed to the comparator circuit 10 is set to a voltage of the vertical sawtooth wave corresponding to the center position of the screen in a vertical sweeping direction. The comparator circuit 10 is made up of a voltage comparator. Alternatively, the amplitude of the vertical sawtooth wave may be supplied to the comparator circuit 10 as an current and is converted to a voltage which is compared with the reference voltage. Alternatively, the current may be compared with the current corresponding to the reference voltage.

A bottom of a center of the distortion correction signal (parabolic wave) is located at a center position of the screen as shown in FIG. 10c as also in the case in which the center P of the screen is shifted from the center Q of the vertical sawtooth wave as shown in FIGS. 10a and 10b. This shift is generated, for example by variations in mounting of deflecting yoke in a manufacturing process. The distortion correction signal can be generated, which is capable of properly correcting the side pincushion distortion which is asymmetric in a vertical direction on the screen.

As for a reference case in which the reference voltage Vref is set to the center of the amplitude of the vertical sawtooth wave, a shift of a center of the screen from a center of the amplitude of the vertical sawtooth wave makes the distortion correction signal such one as shown by a dotted line in FIG. 10c and the bottom of the center of the distortion correction signal (parabolic wave) is not located in the center position of the screen. Accordingly, the distortion which depends on the position on the screen can not be properly corrected. Such a problem occurs in, for example, an apparatus which is disclosed in above-mentioned JP-A-5-308538. Since the parabolic wave is not generated by the multiplier circuit, but is generated by an integrator circuit in the apparatus which is disclosed in JP-A-5-308538 as mentioned above, the center of the amplitude of the vertical sawtooth wave matches the bottom of the center of the distortion correction signal so that the distortion correction signal is such one as shown by the dotted line in FIG. 10c even if the center of the vertical sawtooth wave is shifted from the center of the screen. With an apparatus disclosed in the above-mentioned JP-A-5-308538, in which the correction section in which the gain is changed is set with reference to the vertical synchronization signal, if the center of the amplitude of the vertical sawtooth wave is shifted from the center of the screen in a vertical direction after the adjustment of the distortion, the distortion correction will become ineffective and hence it is necessary to perform a distortion adjustment again, for example, by changing the relation between the correction section and the correction amount. In contrast to this, the distortion correction signal is generated by using the reference voltage which is set to a voltage corresponding to the central position of the screen in the present embodiment, so that the bottom of the center of the distortion correction signal constantly coincides with the center of the screen. As a result, even if the center of the displayed image is shifted upwardly or downwardly on the screen after the distortion adjustment is conducted once, no readjustment of the side pincushion distortion is necessitated.

A second embodiment of the present invention will now be described. FIG. 2 is a diagram illustrating a configuration of a distortion correcting circuit which forms the second embodiment of the present invention. Referring to FIG. 2, the distortion correcting circuit in accordance with the second embodiment of the present invention is different from that of the first embodiment in the arrangement of the multiplier circuit and the variable gain type amplifier circuit. More specifically, the distortion correcting circuit of the second embodiment comprises a comparator circuit 10 which receives a vertical sweeping vertical sawtooth wave Vsaw as an input and compares the voltage of the vertical sawtooth wave Vsaw with a reference voltage Vref which is set to the voltage of the vertical sawtooth wave corresponding to a center position of the screen in a vertical sweeping direction, a variable gain type amplifier circuit 12 which amplifies a difference voltage between the voltage of the vertical sawtooth wave Vsaw and the reference voltage Vref, a control circuit 13 which receives a comparison result by the comparator circuit 10 as a selection control signal and sets a gain of the amplifier circuit 12 to a first gain A1 when the voltage of the vertical sawtooth Vsaw is lower then the reference voltage, and to a second gain A2 when the voltage of the vertical sawtooth Vsaw is equal or higher than the reference voltage Vref, respectively, and a multiplier circuit 11 which generates a parabolic wave by using the output from the amplifier circuit 12 to output the parabolic wave as a distortion correction signal Vo. As is the case of the first embodiment, the amplifier circuit 12 may be constituted of a voltage controlled amplifier circuit (VCA) having a gain which is varied on the basis of a control voltage fed to the amplifier. In this case, the control circuit 13 provides control voltages Vc1 and Vc2 corresponding to the first and second gains A1 and A2, respectively to the voltage controlled amplifier circuit 12 based upon a comparison result in the comparator circuit 10.

The multiplier circuit 11 outputs the distortion correction signal Vo having an amplitude corresponding to a value (A×(Vsaw−Vref)$^2$) which corresponds to an output from the amplifier circuit 12 having a gain A (A×(Vsaw−Vref)) which is multiplied by the difference between the vertical sawtooth wave Vsaw and reference voltage Vref (Vsaw−Vref).

Figure 4:
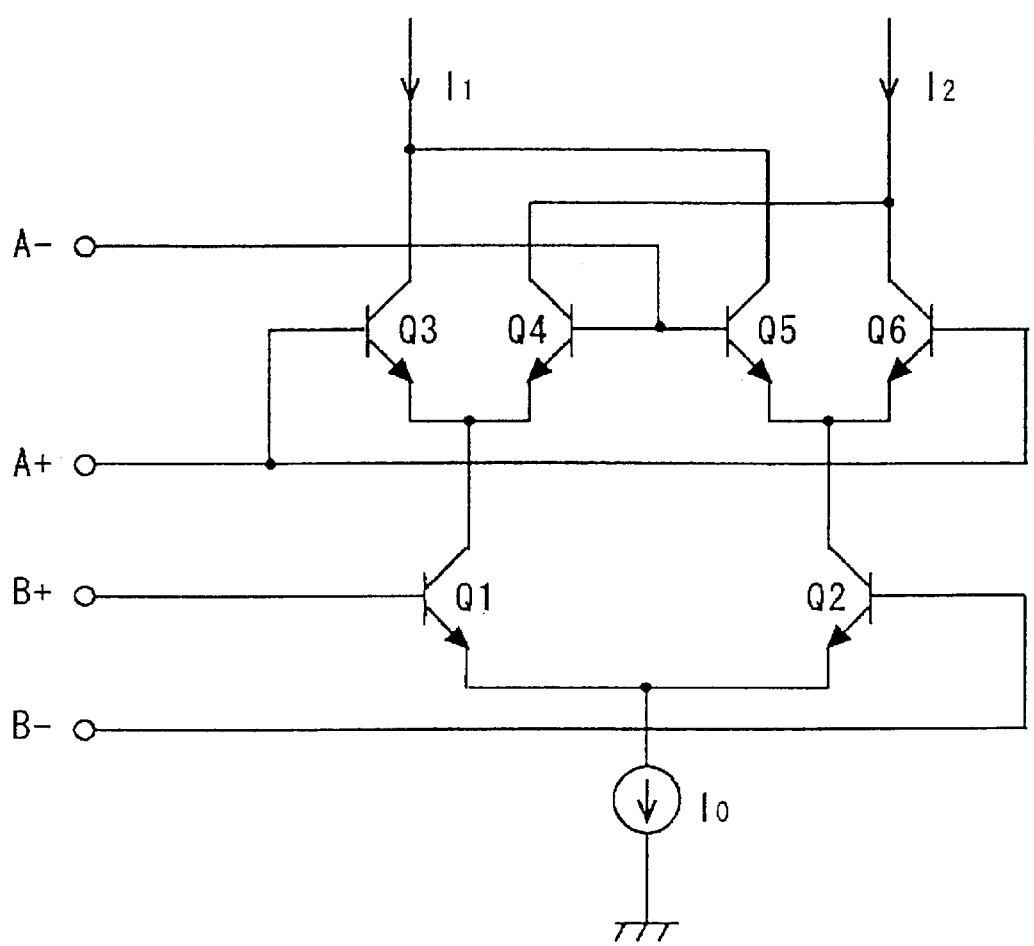
FIG. 4 is a circuit diagram showing an exemplary multiplier circuit.

Any known circuit may be utilized as the multiplier circuit 11. Connections of signals in the multiplier circuit 11 as shown in FIG. 2 will now be described with reference to a Gilbert multiplier circuit which outputs a value corresponding to a product of the input voltages X and Y. FIG. 4 is a diagram of a basic configuration of the Gilbert multiplier circuit. Referring to FIG. 4, this multiplier circuit comprises a first differential pair of transistors Q1, Q2, a constant current source $I_0$, and second and third differential pairs of transistors Q3, Q4 and Q5, Q6. Emitters of transistors Q1 and Q2 are commonly connected to the constant current source $I_0$, emitters of transistors Q3 and Q4 are commonly connected to a collector of the transistor Q1, and emitters of transistors Q5 and Q6 are commonly connected to a collector of the transistor Q2. Collectors of transistors Q3 and Q4 and collectors of transistors Q5 and Q6 are mutually cross-connected. A first voltage X is fed differentially to differential input terminals A+ and A− which are connected to the bases of the second differential transistor pairs Q3, Q4 and third differential transistor pairs Q6 and Q5. A second voltage Y is fed differentially to differential input terminals B+, B− which are connected to the bases of the first differential transistor pair Q1 and Q2. A current which is proportional to a value X×Y which is the first voltage X multiplied with the second voltage Y is output as a differential current $\Delta I(=I_1-I_2)$ between the collector currents of the transistors Q3 and Q6. Input and output terminals of a current mirror current (not shown) are connected to the collectors of the transistors Q3, Q6, respectively, so that a differential current $\Delta I$ between the collector currents of the transistors Q3 and Q6 are taken out from the connection points of the output terminal of the current mirror circuit and the collector of the transistor Q6. This differential current $\Delta I$ is used if the multiplier circuit 11 outputs the distortion correction signal (parabolic wave). A voltage corresponding to a value X×Y is output by converting the differential current $\Delta I$ to a voltage by a current-voltage converter circuit (not shown) if the multiplier circuit 11 outputs the distortion correction signal Vo as a voltage.

In the present embodiment, the outputs (differential outputs) of the amplifier circuit 12 are connected to the differential terminals B+, B− of the multiplier circuit 11, the vertical sawtooth wave Vsaw is fed to the input terminals A+ and the reference voltage Vref is fed to the input terminal A−. In this case, the distortion correcting signal Vo having an amplitude corresponding to a value {A×(Vsaw−Vref)}× (Vsaw−Vref) is output from the multiplier circuit 11.

In this embodiment, as is the case with the first embodiment, even if the center of the screen is shifted from the center of the vertical sawtooth wave, the bottom of the center of the distortion correction signal (parabolic wave) is located at the center of the screen, and hence the distortion correction signal which is capable of properly correcting the side pincushion distortion which is asymmetric with respect to upper and lower areas of the screen.

Figure 3:
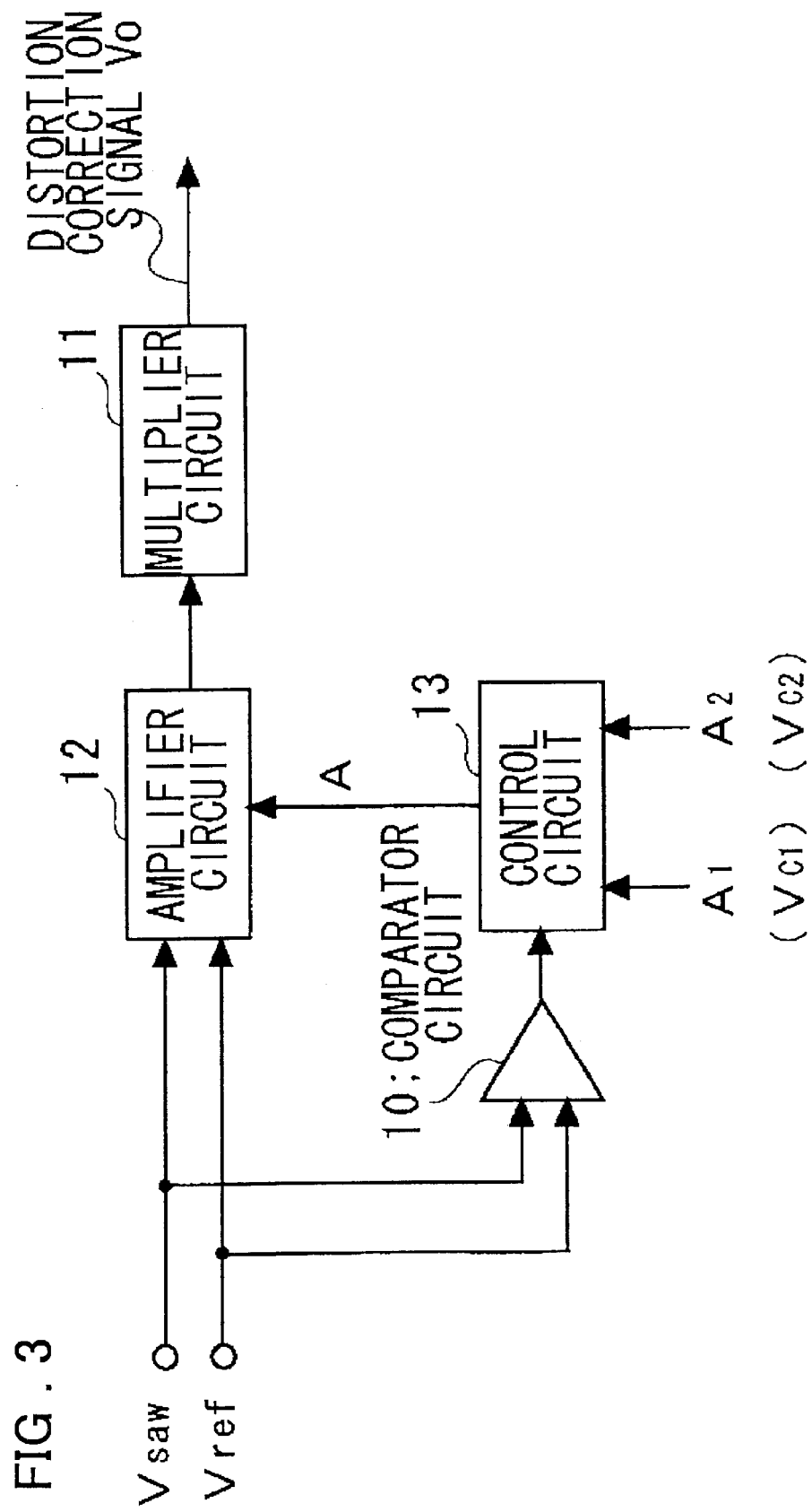
FIG. 3 is a diagram showing a modification of the second embodiment of the present invention.

FIG. 3 is a diagram showing a modification of the second embodiment of the present invention. Referring to FIG. 3, this modification is different from the above mentioned second embodiment in that a signal fed to the multiplier circuit 11 is only an output signal A×(Vsaw−Vref) from the amplifier circuit 12. The distortion correction signal Vo is output having an amplitude corresponding to a value {A× (Vsaw−Vref)}×{A×(Vsaw−Vref)} from the multiplier circuit 11.

In the modification, outputs (differential outputs) of the amplifier circuit 12 is connected to differential input terminals B+, B− of the amplifier circuit 11 as shown in FIG. 4 and is also connected to differential input terminals A+, A−, so that $A^2 \times (Vsaw-Vref)^2$ is output as the distortion correction signal Vo. The operation and effect of this modification is identical with that of the second embodiment.

Figure 5:
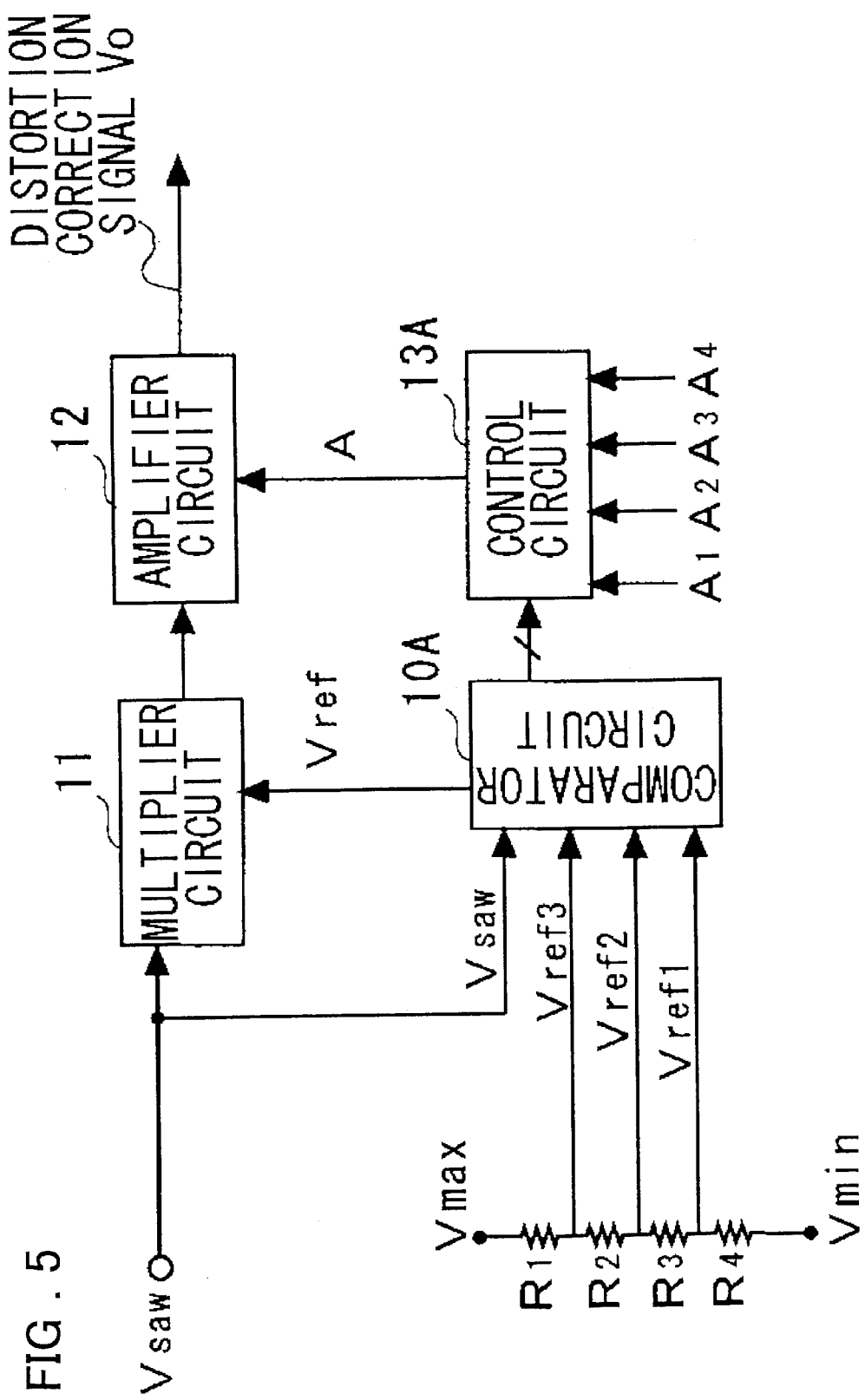
FIG. 5 is a diagram showing the configuration of the third embodiment of the present invention.

A third embodiment of the present invention will be described. FIG. 5 is a diagram illustrating the configuration of the distortion correcting circuit which is the third embodiment of the invention. Referring now to FIG. 5, the distortion correcting circuit in accordance with the third embodiment of the present invention comprises a comparator circuit 10A which compares the voltage of the vertical sawtooth wave Vsaw with a plurality of reference voltages Vref1, Vref2, and Vref3 which are set to the amplitudes of the vertical sawtooth waves respectively corresponding to predetermined vertical positions (predetermined positions located along a vertical sweeping direction) on the screen, multiplier circuit 11 which generates a parabolic wave from the vertical sawtooth wave, a variable gain type amplifier circuit 12 which adjusts the output voltage of the multiplier circuit 11 and a control circuit 13.

The control circuit 13A, based on a detection result by the comparator circuit 10A what section the voltage of the vertical sawtooth wave Vsaw is located at with regard to a plurality of sections of a vertical period, in which these sections are defined by the plurality of reference voltages Vref1, Vref2, and Vref3, selects a gain corresponding to the section from a plurality of gains A1 to A4 and provides the selected gain to the variable gain type amplifier circuit 12. The variable gain type amplifier circuit 12 amplifies the output voltage from the multiplier circuit 11 with the gain and outputs the amplified signal from an output terminal as a distortion correction signal.

The multiplier circuit 11 is constituted to multiply the difference between the vertical sawtooth wave Vsaw and the reference voltage Vref. The reference voltage Vref which is fed to the multiplier circuit 11 may be fixed to, for example, the reference voltage Vref 2, or may be selected among the reference voltages Vref1, Vref2, and Vref3 depending upon which section of the vertical period the voltage of the vertical sawtooth wave Vsaw is located at and may be supplied from the comparator circuit 10A to the multiplier circuit 11.

Referring to FIG. 5, the reference voltages Vref1, Vref2, and Vref3 which are fed to the comparator circuit 10A are generated by dividing the constant voltages Vmax, and Vmin by voltage dividing resistors R1, R2, R3,and R4 in FIG. 5. The voltages Vref1, Vref2, and Vref3 may be generated respectively by discrete bias voltage sources. The number of the reference voltages may be 2, or more than 3. The control circuit which receives output (plural bits outputs) from the comparator circuit 10A and selects a gain among the plurality of gains A1 to A4 is made up of, for example, a decoder circuit and a change-over switch (both not shown). The decoder circuit decodes an output result from the comparator circuit 10A. The change-over switch selects one of the plurality of gains A1 to A4 at a time depending upon which of the sections divided by the reference voltages Vref1, Vref2, and Vref3, the voltage of the vertical sawtooth wave Vsaw received is currently located at based upon a decoding result from the decoder and outputs the selected gain to the amplifier circuit 12 as the gain A.

In the third embodiment of the present invention, the reference voltage Vref2 is for example set to the voltage of the vertical sawtooth wave corresponding to the center of the screen in a vertical sweeping direction. In FIG. 5, the voltage dividing resistors R1, R2, R3, and R3 for generating the reference voltages are comprised of variable resistors, the resistances of which are variable and the resistances of the resistors are adjusted on an adjustment process for shipment in a manufacturing process of the display apparatus so that they have desired resistances. Alternatively, the preset values of the reference voltages may be stored in a non-volatile memory such as EEPROM (not shown). The values of the non-volatile memory may be set into a register (not shown) on a power on sequence, so that the reference voltages are output by setting the values of the reference voltage source (not shown) based upon the values in the register.

In this embodiment, as is the case with the first and second embodiment, even if the center of the screen is shifted from the center of the vertical sawtooth wave, the bottom of the center of the distortion correction signal (parabolic wave) is located at the center of the screen, and hence the distortion correction signal which is capable of properly correcting the side pincushion distortion which is asymmetric with respect to upper and lower areas of the screen. Since the third embodiment is configured in such a manner that the amplitude of the distortion correction signal is adjusted by a gain corresponding to each of the plurality of sections of the screen in a vertical direction thereof, the side pincushion distortion can be properly adjusted for each section.

Figure 6:
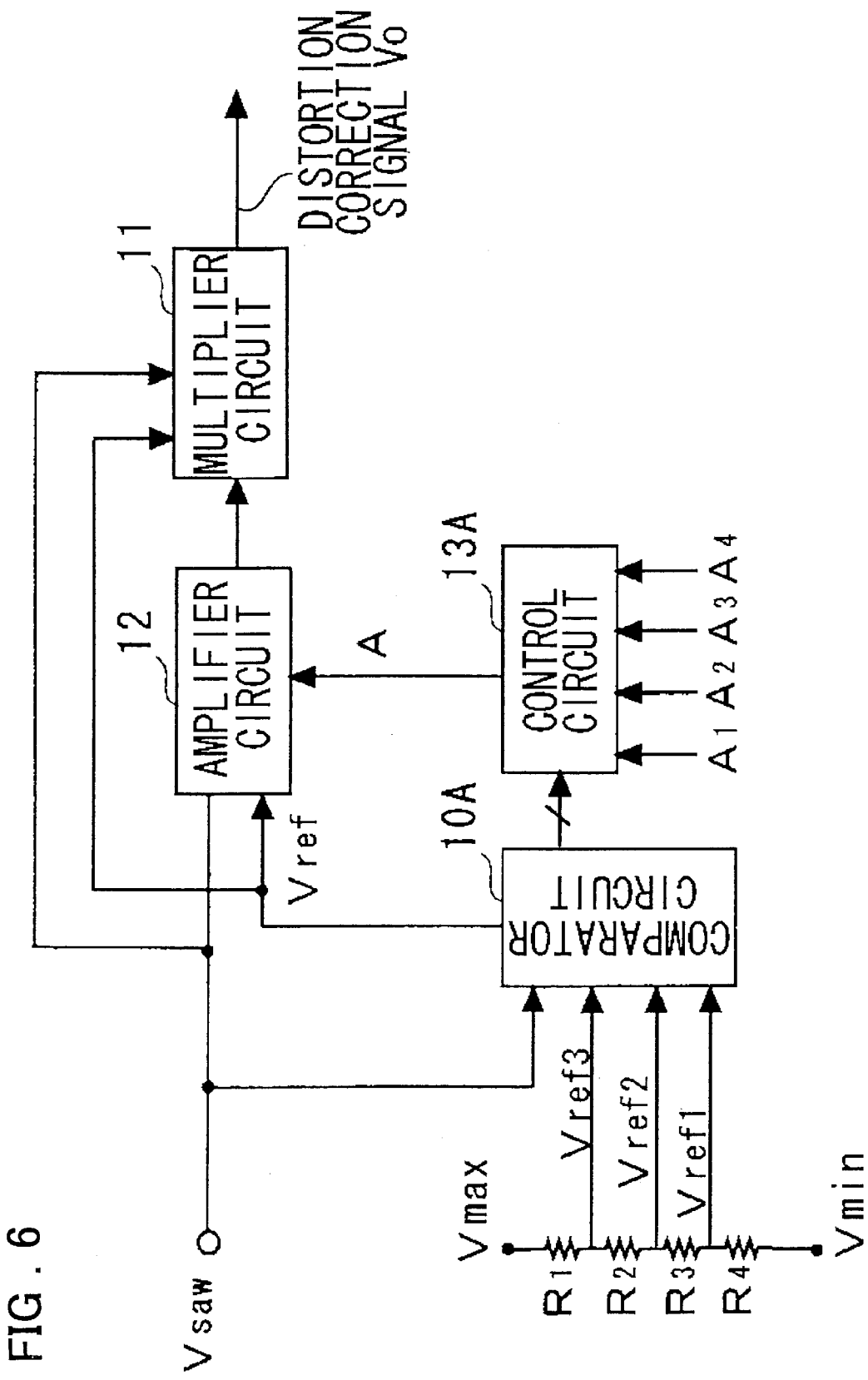
FIG. 6 is a diagram showing the configuration of the fourth embodiment of the present invention.

Now, a fourth embodiment of the present invention will be described. FIG. 6 is a diagram illustrating the configuration of the distortion correcting circuit which forms the fourth embodiment of the present invention. Referring now to FIG. 6, the distortion correcting circuit is substantially identical with that in the third embodiment except that the arrangement of the amplifier circuit 12 and the multiplier circuit 11 is changed so that the distortion correction signal Vo is output from the multiplier circuit 11 which multiplies an output signal amplified by the amplifier circuit 12. The output of the amplifier circuit 12 (A×(Vsaw−Vref)) and, the vertical sawtooth wave Vsaw and reference voltage Vref are fed to the multiplier circuit 11 as is the case with the second embodiment, and A×(Vsaw−Vref)$^2$ is output as the distortion correction signal Vo.

Figure 7:
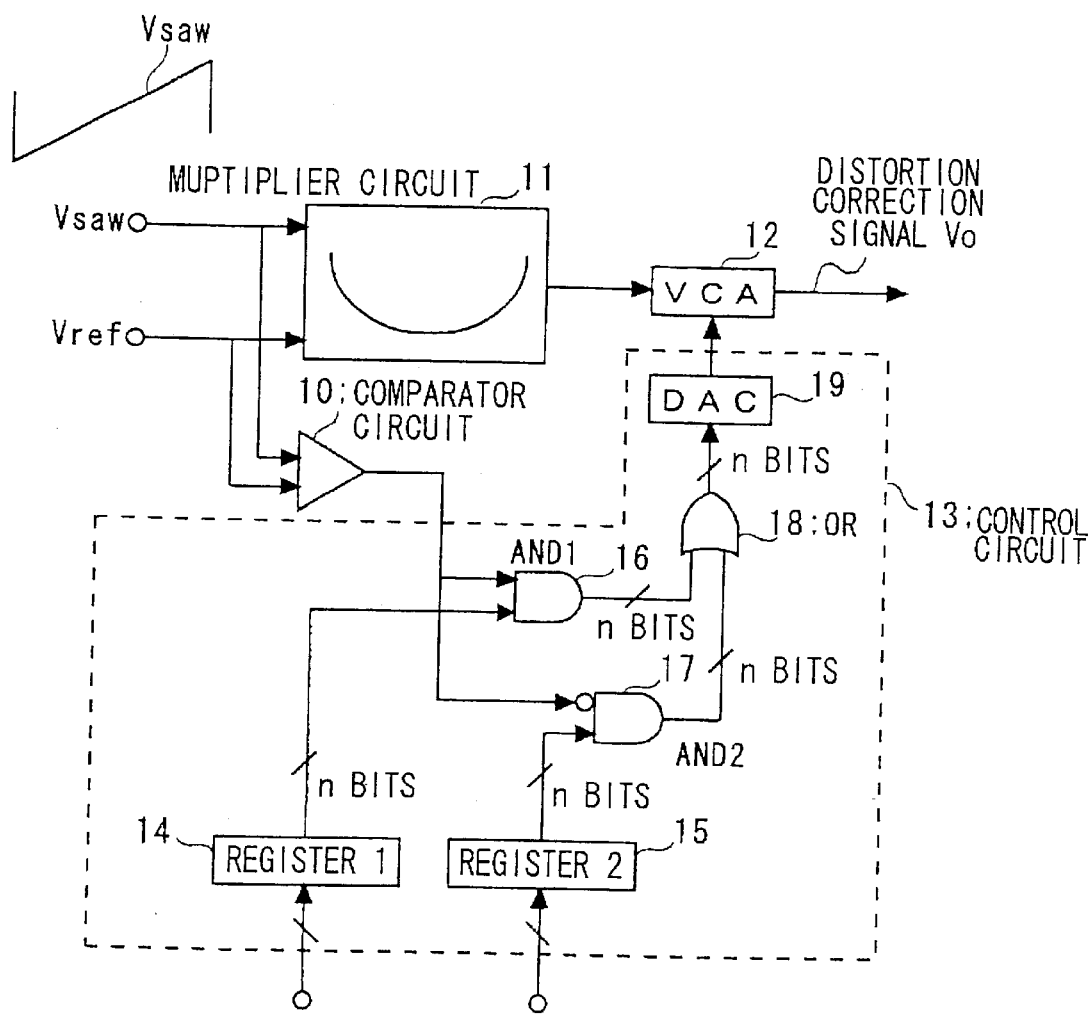
FIG. 7 is a circuit diagram showing an example of the detailed configuration of the first embodiment of the present invention.

FIG. 7 is a circuit diagram showing the detailed configuration of the control circuit 13 which provides a control voltage to the amplifier circuit 12 made up of a voltage controlled amplifier circuit in the first embodiment of the present invention.

Referring now to FIG. 7, the control circuit 13 comprises a first and second registers 14 and 15 which store digital values corresponding to a first and second control voltages, respectively, an AND circuit 16, an AND circuit 17, 2n-input and n-output OR circuit 18, and a digital to analog converter (DAC) 19. The AND circuit 16 outputs in parallel n-bits of signals, each of which is a result of logical AND operation of each bit of the output (n bits) of the first register 14 and a comparison result signal from a comparator circuit 10. The AND circuit 16 outputs the output signal from the first register 14 and 0 when the comparison result output from the comparator circuit 10 is 1 and 0, respectively. The AND circuit 17 outputs in parallel n-bits of signals, each of which is a result of logical AND operation of each bit output from the second register 15 (n bits) and a complimentary signal of a comparison result from the comparator circuit 10. The AND circuit 17 outputs the output signal from the second register 15 and 0 when the comparison result output from the comparator circuit 10 is 0 and 1, respectively. The 2n-input and n-output OR circuit 18 receives n-bit outputs from the AND circuit 16, 17 and outputs in parallel n bits of signals, each of which is a result of a logical OR operation of corresponding pair of bit signals. The output signal from the OR circuit 18 is fed to the digital to analog converter (DAC) 19 and the analog voltage output from the digital to analog converter 19 is fed to the voltage controlled amplifier circuit 12 as a control signal.

The configuration which is shown in FIG. 7 is equivalent to the function of a selector which comprising n pairs of first and second tri-state buffers (when one of the buffers is output enabled, the other buffer is set in a high impedance state) to which receives corresponding two bits from first and second registers 14 and 15. The output enable terminals of the first and second buffers are controlled by the output and the inverted output of the comparator circuit 10, respectively. The output terminals of the first and second buffers are connected and the connection node of the output terminals of the first and second buffers is connected to the corresponding input of the digital to analog converter 19.

On an inspection or test process for shipment of the display apparatus in a manufacturing process, the values of the gains to be set in the first and second registers 14, 15 are written in a non-volatile memory such as EEPROM (electrically-erasable and programmable read-only memory) provided in the display apparatus. On an initialization process executed at the time of power on sequence of the display apparatus, the values of the gains are read from the non-volatile memory by a CPU (not shown) and are set into the first and second registers 14, 15.

Figure 8:
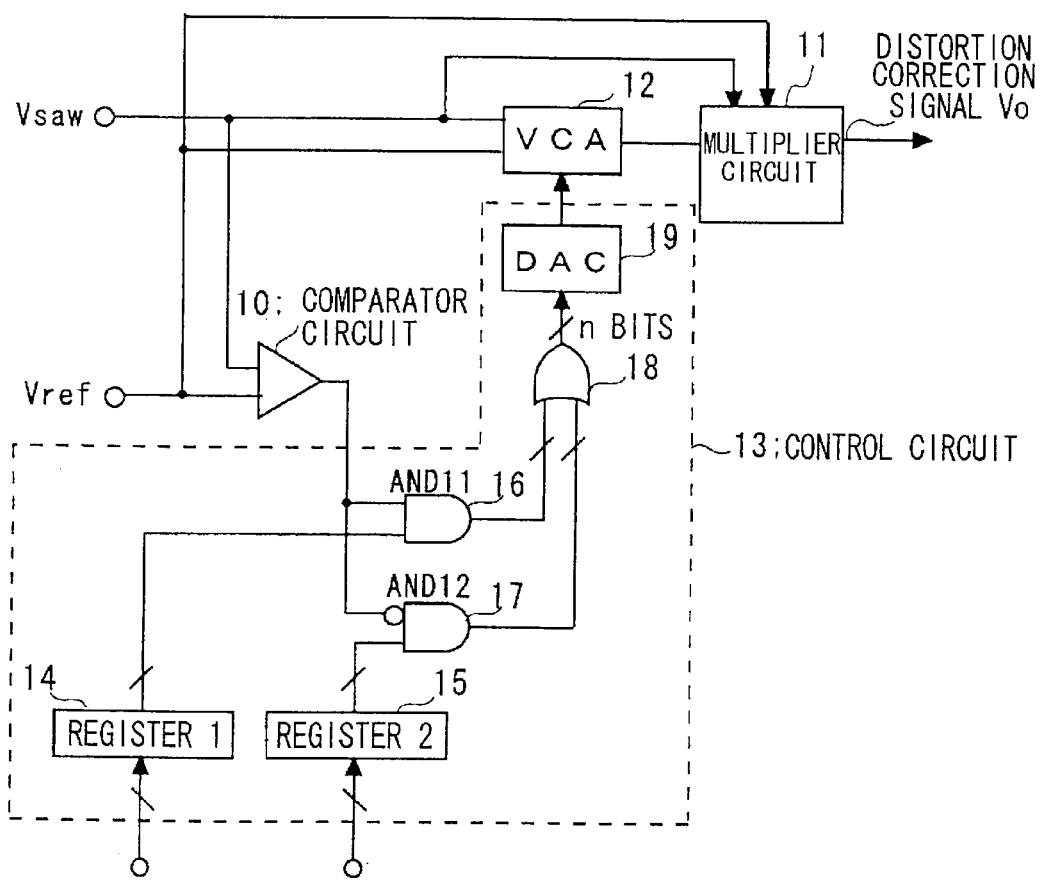
FIG. 8 is a circuit diagram showing an example of the detailed configuration of the second embodiment of the present invention.

FIG. 8 is a diagram showing in detail the configuration of the control circuit for supplying a control voltage to the amplifier circuit which is made up of a voltage controlled amplifier circuit in a modification of the above-mentioned second embodiment. Referring now to FIG. 8, the configuration of the control circuit 13 is similar to the control circuit 13 which is shown in FIG. 7.

Figure 9A:
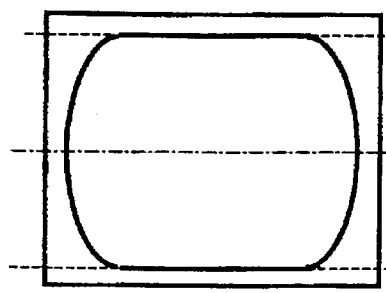
FIGS. 9a to 9d are views for explaining the principle of the operation of the embodiment of the present invention.
Figures 9B, 9C:
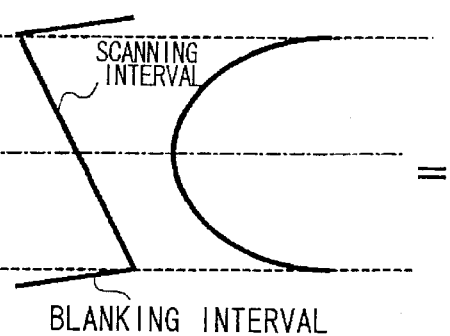
Figure 9D:
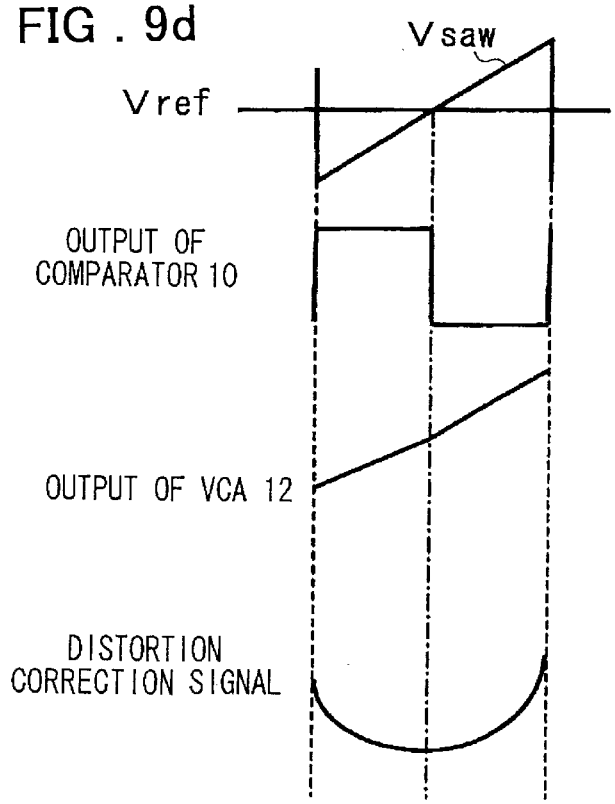

FIGS. 9 and 10 are schematic views for explaining the principle of operation in the above mentioned embodiments of the present invention. The relation between a raster image displayed on a CRT (FIG. 9a), a vertical sawtooth wave (FIG. 9b) and a distortion correction signal (FIG. 9c) when a center of the amplitude of the vertical sawtooth wave coincides with a center of the screen in a vertical sweeping direction is shown in FIG. 9. The waveforms of the vertical sawtooth wave, and the output of the comparator circuit 10, the output of the amplifier circuit 12 and the output of the multiplier circuit 11 (distortion correcting signal) in the circuit shown in FIG. 8 are shown in FIG. 9d. The relation between the levels of the vertical sawtooth wave and the reference voltage Vref is reversed (the output from the comparator circuit 10 is reversed) at the center of the amplitude of the vertical sawtooth wave, so that the output of distortion correction signal of the multiplier circuit 11 which multiplies the output of the amplifier circuit 12 becomes symmetric with respect to the center of the screen as shown in FIG. 9c.

The relation between a raster image displayed on the CRT (FIG. 10a), the vertical sawtooth wave (FIG. 10b) and the distortion correction signal (FIG. 10c) when the center of the amplitude of the vertical sawtooth wave does not coincides with the center of the screen in a vertical sweeping direction and is shifted therefrom in the configuration of FIG. 8 is shown in FIG. 10. The waveforms of the vertical sawtooth wave, and the output of the comparator circuit 10, the output of the amplifier circuit 12 (output of VCA 12) and the output of the multiplier circuit 11 (distortion correction signal) in the circuit shown in FIG. 8 are shown in FIG. 10d. If the center of the amplitude of the vertical sawtooth is shifted from the center of the screen which is a vertical sweeping direction, for example, the upper end of a raster (starting end of the scanning) is shifted downwardly and a ratio of a time interval between the raster upper end (scanning starting end) and the screen center P to a time interval between the screen center P and the raster lower end (scanning completion end) is r:s (r<s in case shown in FIG. 10), the relation between the waveform Vsaw of the vertical sawtooth wave fed to the comparator circuit 10 and the reference voltage Vref will become as shown in FIG. 10d. The reference voltage Vref is set to the voltage (voltage of the vertical sawtooth wave) corresponding to the screen center P in a vertical scanning direction. In this case, the reference voltage is lower than the voltage of the amplitude center Q of the input vertical sawtooth. On the contrary, if the shift between the amplitude center of the vertical sawtooth and the screen center in a vertical sweeping direction is reversed to that shown in FIGS. 10a and 10b (r>s in FIG. 10(d)), the reference voltage Vref is higher than the voltage of the amplitude center Q of the input vertical sawtooth wave.

The amplifier circuit 12 amplifies the input signal at a first gain A1 until the voltage of the vertical sawtooth wave exceeds the reference voltage Vref after the voltage Vsaw increases from the scan start voltage. The output signal of the comparator circuit 10 becomes reversed when the vertical sawtooth wave exceeds the reference voltage Vref. Thereafter, the amplifier circuit 12 amplifies the input signal at the second gain A2 until the completion of scanning, and hence the distortion correction signal Vo becomes a parabolic wave having its bottom located at the screen center P.

The reference voltage Vref is set up to a value corresponding to the screen center by the adjustment for example on a final test for a shipment in a manufacturing process of the display apparatus. The set up value of the reference voltage may be written in a non-volatile memory such as EEPROM, and on a power on sequence, the set up value of the reference voltage is set in a register (not shown), from which the value is fed to a digital/analog converter (not shown) which outputs a reference voltage.

Figure 11A:
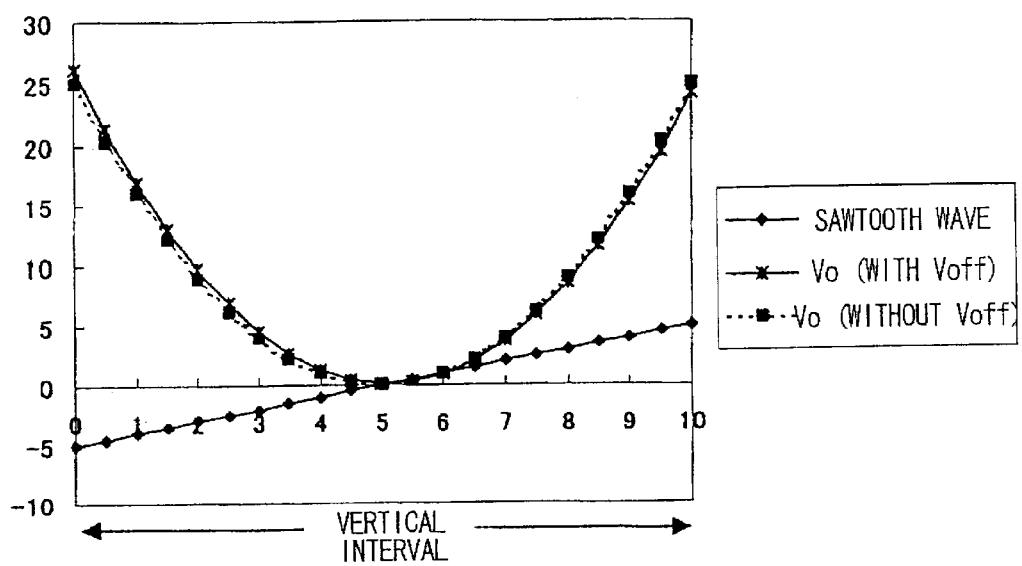
FIGS. 11a and 11b are graphs for explaining the offset of the distortion correction signal in the embodiments of the present invention.
Figure 11B:
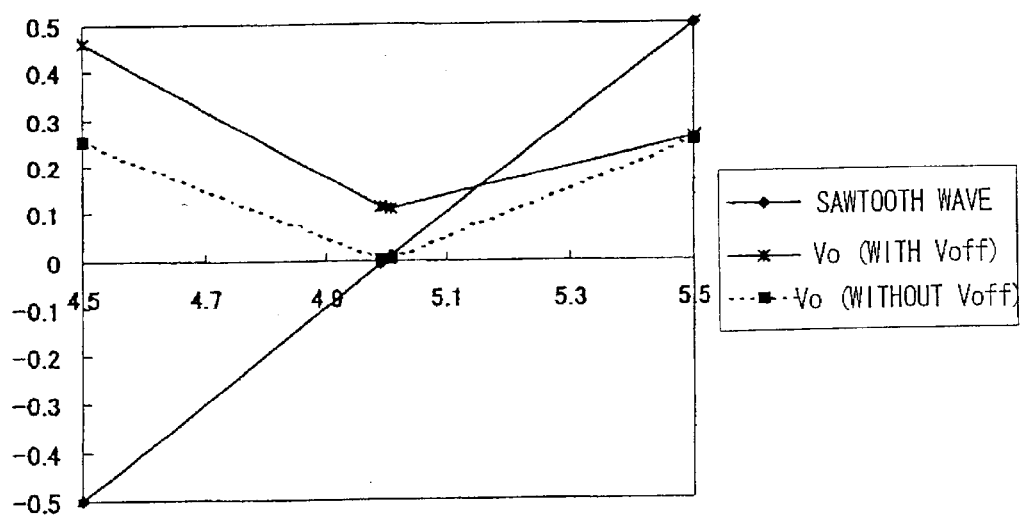

FIG. 11a is a graph illustrating the relation between the distortion correction signal Vo (the amplitude in one vertical period) and the vertical sawtooth wave (solid line connecting rhombus marks) in the foregoing first and second embodiments. FIG. 11b is a graph illustrating an enlarged central area in FIG. 11b in detail (an axis ordinate represented in unit of 100 mV). Since the multiplication is not individually performed in upper and lower areas of sweeping in the present invention, no step occurs in the parabolic signal $Vpara=K \times (Vsaw+Voff1)^2$ from the multiplier circuit 11 between the upper and lower areas of the screen even if there is an input offset Voff1 of the multiplier circuit 11.

With respect to an input offset of the amplifier circuit 12, the distortion correction signal Vo output from the amplifier circuit 12 becomes $Vo=A \times (Vpara+Voff2)$ (wherein A denotes the gain of the amplifier circuit 12). The gain A is set to different values at first and latter halves of the vertical period. The distortion correction signal Vo without offset is represented by a dotted line (no Voff) connecting square marks in FIG. 11. The distortion correction signal Vo with offset is represented by a line (with Voff) connecting marks X.

It is assumed that the vertical sawtooth wave has an amplitude of ±5V, the input offset Voff1 of the multiplier circuit 11 is −100 mV, and the input offset of the amplifier circuit 12 is 100 mV, both the gains A1, A2 in the first and latter halves of one vertical interval are 1, the step at the screen center in the distortion correcting signal V (with Voff) is hardly noticed as shown in FIG. 11.

Figure 12A:
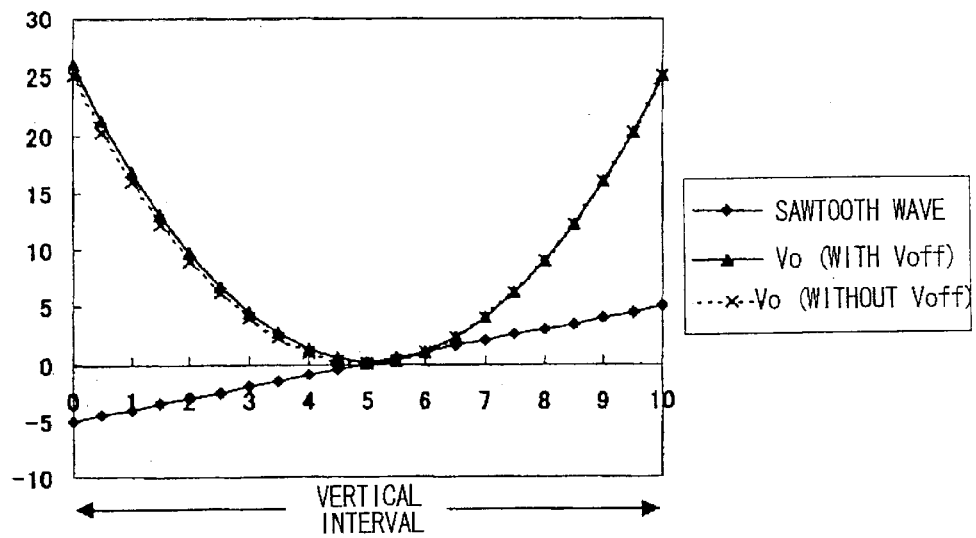
FIGS. 12a and 12b are graphs for explaining the offset of the distortion correction signal in a prior art as a reference case.
Figure 12B:
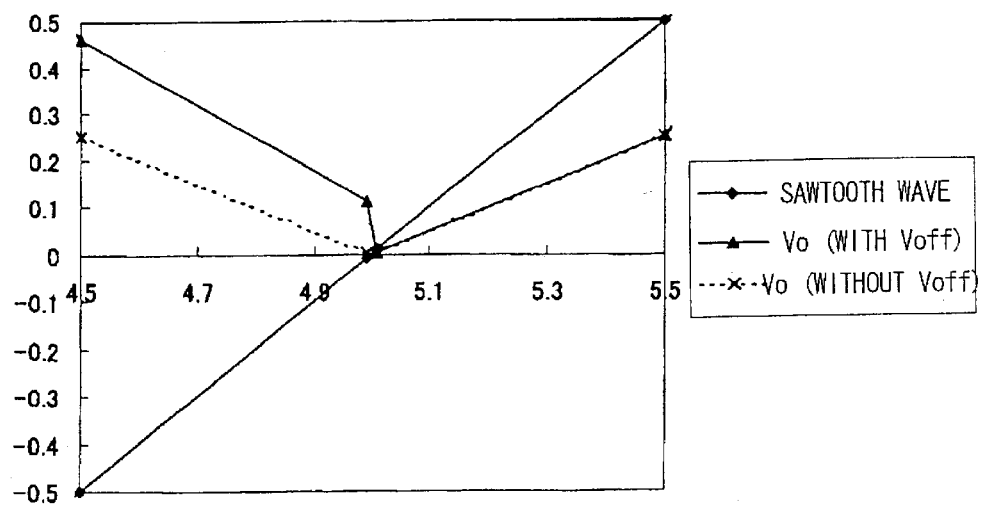
Figure 14A:
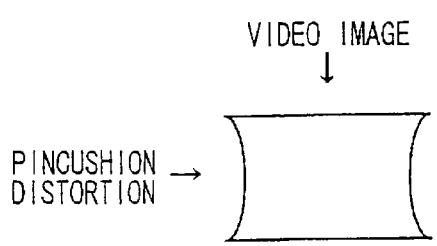
FIGS. 14a to 14f are views for explaining the distortion correcting operation in the embodiments of the present invention.
Figure 14D:
Figure 14B:
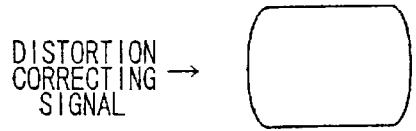
Figure 14E:
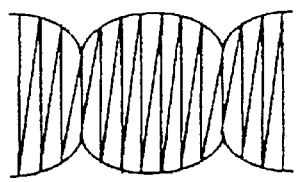
Figure 14C:
Figure 14F:
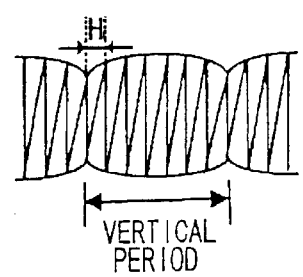

As a reference case, the configuration corresponding to that shown in FIG. 18 in which a slice point is set to the screen center will be explained. FIG. 12a is a graph showing a relation between the distortion correcting signal Vo (the amplitude of one vertical period) comprising a parabolic wave and the vertical sawtooth wave (a solid line connecting rhombic marks) in the configuration corresponding to that shown in FIG. 18 (provided that the slice point is located at the screen center). FIG. 12b is a graph showing the enlarged central area in the screen in FIG. 12a (an axis of ordinate represented in unit of 100 mV).

If there should be variations between the output offsets of two differential comparator circuit (slice circuits), they are squared by the multiplier circuit. Taking into account the output offset Voff1 of the differential comparator circuit (slice circuit), the output of the multiplier circuit will become $Vpara=K \times (Vsaw+Voff1)^2$. If the input offsets of the amplitude circuits (gain control circuits) 107, 108 are denoted as Voff2, the distortion signal which is a sum of the outputs of two amplitude adjusting circuits 107 from an adder 109 becomes $Vo=A \times (Vpara+Voff2)$. If the distortion correction signal Vo is sliced into two parts corresponding to upper and lower areas of the screen by two differential comparator circuits, the signal $Vo=A \times (Vpara+Voff2)$ is replaced with values of the differential comparator circuit and amplitude adjusting circuit in the first and latter halves of one vertical period, respectively.

Figure 15A:
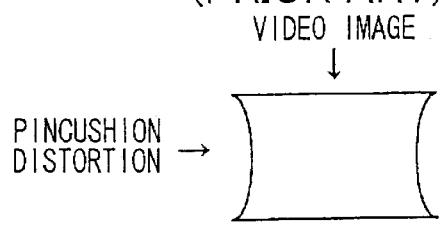
FIGS. 15a to 15f are views for explaining the distortion correcting operation in a prior art as a control.
Figure 15B:
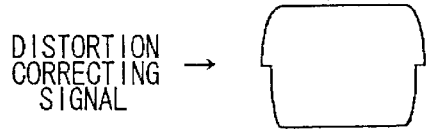
Figure 15C:
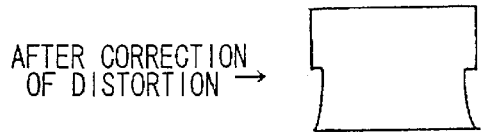
Figure 15D:
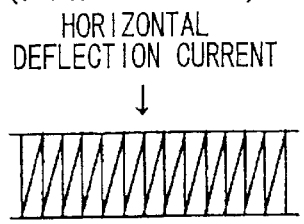
Figure 15E:
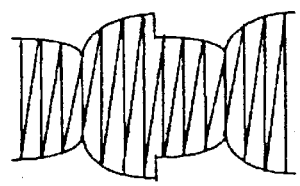
Figure 15F:
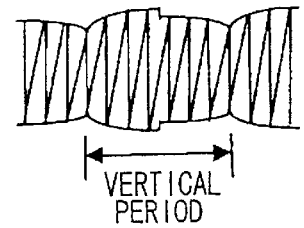
Figure 16A:
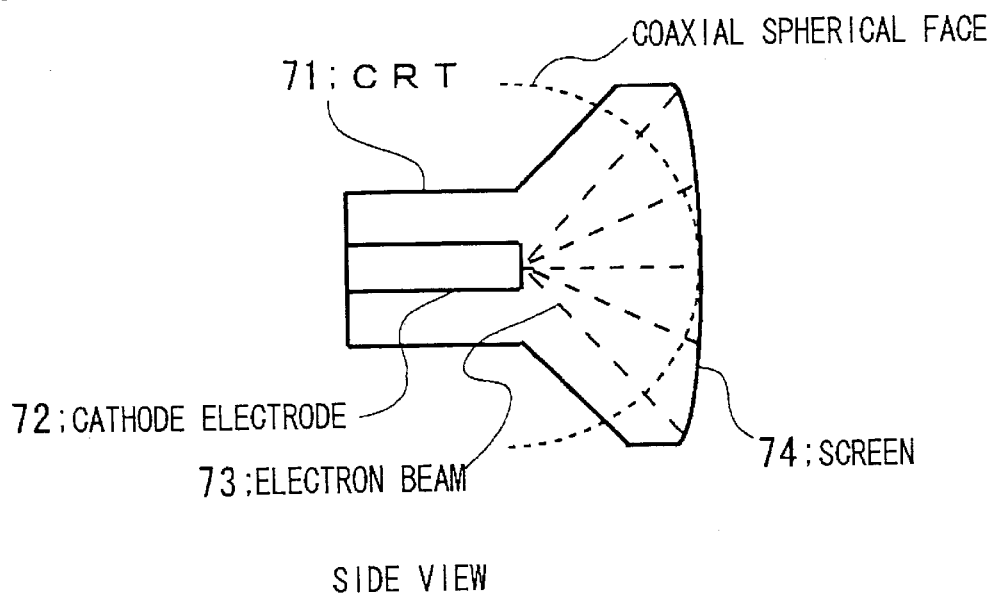
FIGS. 16a and 16b are diagrams for explaining the pincushion distortion.
Figure 16B:
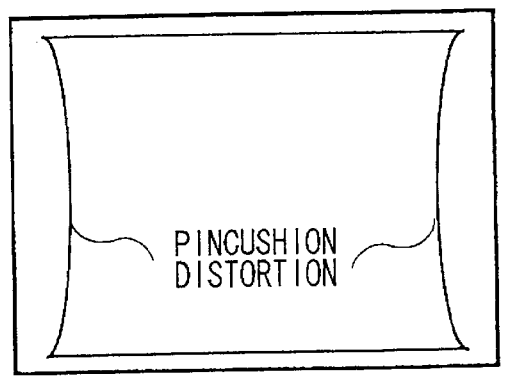
Figure 18:
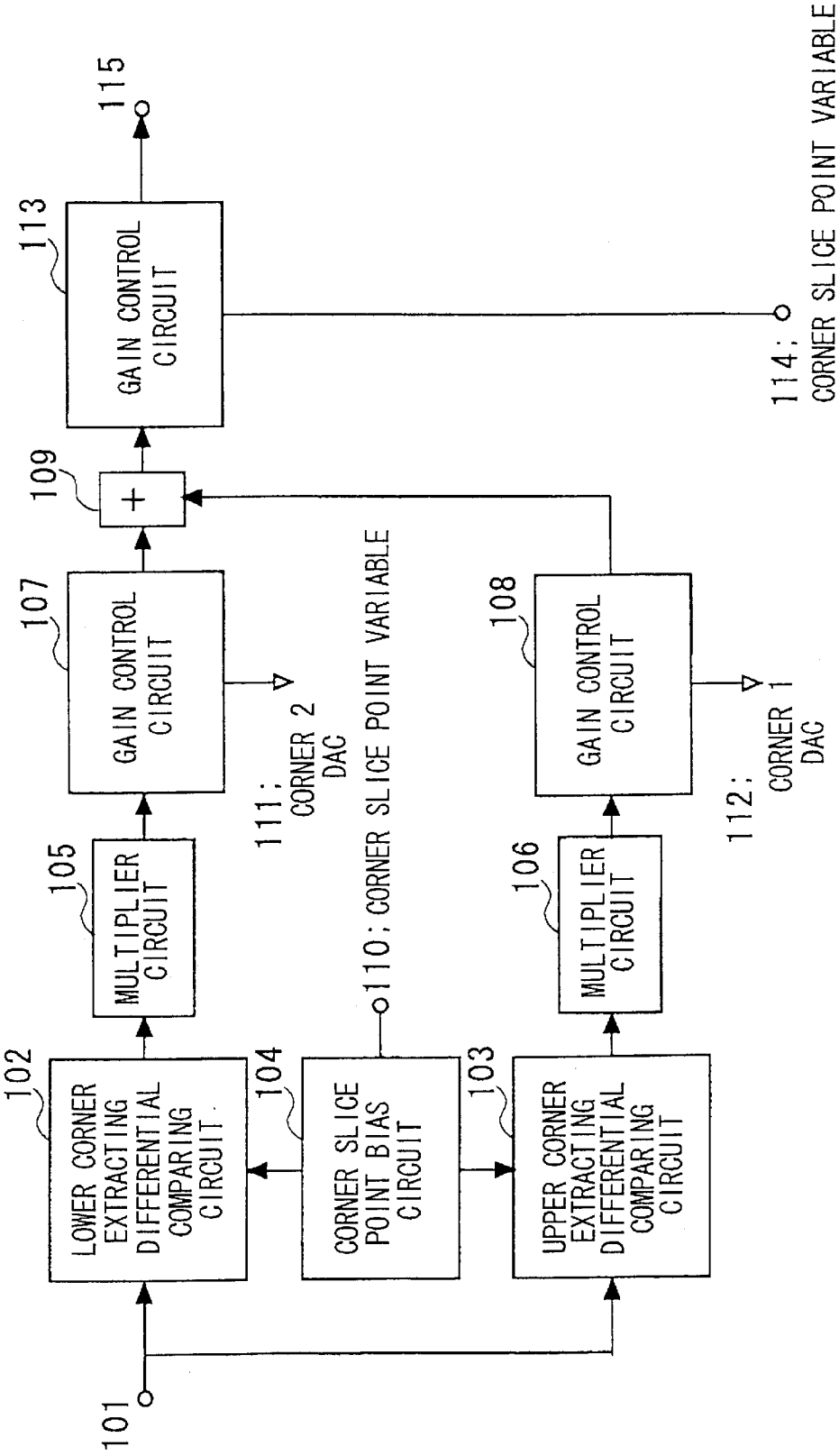
FIG. 18 is a block diagram showing the configuration which is disclosed in JP-A-6-334887.

If it is assumed that for the vertical sawtooth wave of ±5V, the first differential comparator circuit (slice circuit) 102 in FIG. 18 has an offset of −100 mV, the second differential comparator circuit (slice circuit) 103 has no offset, the first amplitude adjusting circuit 107 has an input offset of 100 mV, the second amplitude adjusting circuit 108 has an input offset of 0V, the first and second amplitude adjusting circuits 107, 108 have a gain of 1, the distortion correcting signal will have an step of 100 mV in the center thereof as shown in FIG. 12 (refer to FIG. 12b). This step is changed by the gain set up to the amplitude adjusting circuit. A step in a horizontal direction occurs in the raster image as shown in FIG. 15c when a step occurs in the distortion correction signal.

In contrast to this, no step appears due to an offset in accordance with the present invention, so that a side pincushion distortion can be properly corrected as shown in FIG. 14.

The characteristics of the distortion correction signal will be considered with reference to an apparatus as set forth in JP-A-11-313222. In this apparatus, a parabolic wave (=k1×Vsaw²) and a third power wave (A×K2×Vpara×Vsin) are used. The distortion correction signal Vo becomes as shown in FIG. 13. If only the lower area of the screen is corrected, it suffices to make the distortion correction signal for the upper area of the screen 0, but a distortion newly occurs in the vicinity of ¼ and ¾ of the screen. In other words, when a third power wave which is symmetric with respect to the center of the screen in a vertical direction and correction of, for example, upper area of the screen is conducted, the third power wave gives an influence upon the parabolic wave in the lower area of the screen if the distortion correcting wave is zero at the upper area of the screen.

In contrast to this, no combination of a parabolic wave with a third power wave is used and the distortion correction is simplified in accordance with the present invention. The distortion due to the third power wave as in the configuration as set forth in JP-A-11-313222 will not appear. Accordingly, the adjustment for the distortion is made remarkably easy.

Figure 17:
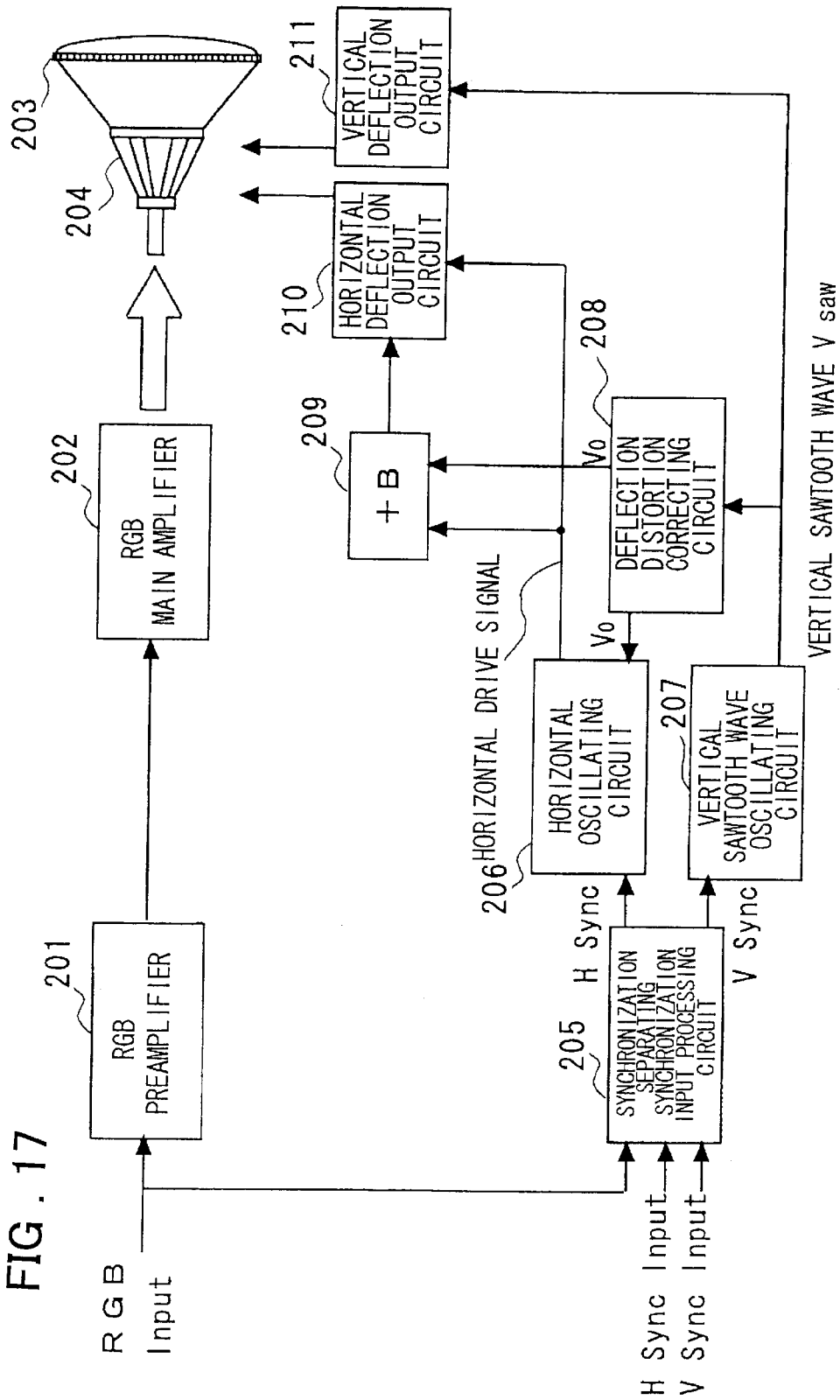
FIG. 17 is a block diagram showing the basic structure of a CRT monitor including the distortion correcting circuit.

The distortion correcting circuit of the present invention may be applied to any display apparatus including a CRT and is used as the deflection distortion correcting circuit 108 for the display apparatus shown in FIG. 17. The distortion correction signal having one period which is one vertical period is amplitude-modulated with a horizontal deflection current and is supplied from the horizontal deflection output circuit 210 to a horizontal deflection coil.

The distortion correcting circuit of the above-mentioned embodiments is preferably applied to the correction of the vertically asymmetric distortion of the display apparatuses which increases their size and flatness of the screen. In comparison with the configuration having two systems each comprising a differential comparator circuit, multiplier circuit, amplitude adjusting circuit (voltage controlled amplifier circuit) for each of upper and lower areas of the screen like the configuration disclosed in the above-mentioned JP-A-6-334887 (refer to FIG. 8), only one system comprising a differential comparator circuit, multiplier circuit, and amplitude adjusting circuit is required in accordance with the present invention. The circuit configuration of the control circuit is small in scale as shown in FIGS. 7 and 8. The offset in the present invention is remarkably smaller in comparison with that of the configuration disclosed in JP-A-6-334887, so that no step appears in the raster image. Reduction in cost and improvement in image quality can be achieved by a simple circuit configuration.

Although the present invention has been described with reference to embodiments, the present invention is not limited to the foregoing embodiments. It is to be understood that the present invention includes any modifications and change made by those skilled in the art without departure from the spirit and scope of the invention as set forth in the claims.

The meritorious effects of the present invention are summarized as follows.

As mentioned above, the present invention provides a meritorious effect that the distortion of image can be individually corrected at each areas such as in the upper and lower areas of the screen while reducing the scale of the circuit. The reason is that in the present invention, only one system comprising a multiplier circuit for generating a distortion correcting parabolic wave and an amplifier circuit is required for a plurality of regions which divide the screen.

The present invention further provides a meritorious effect that a side pincushion distortion and a vertically asymmetric distortion such as a trapezoidal distortion can be properly corrected even if a center of a vertical sawtooth wave is shifted from a center of the screen, while the shift for example being caused by variations in mounting position of an electron gun. The reason is that in the present invention, the amplitude of the vertical sawtooth wave is compared with the reference voltage which is set to an amplitude of the vertical sawtooth wave corresponding to the center of the screen for changing the gain of the amplifier circuit at upper and lower areas of the screen.

In accordance with the present invention, the distortion adjustment of the display apparatus is simplified by a simple circuit configuration, and reduction in manufacturing cost can be achieved. The present invention is preferably applied to the correction of vertically asymmetric distortion of the display apparatus having a large size screen.

The present invention remarkably reduces an offset at the central part of the distortion correction signal (between partial areas), while the offset being caused for example by offsets of a multiplier circuit and an amplifier circuit for amplitude adjustment, so that a step is prevented from appearing on the raster image and contributes to an improvement in image quality.

In accordance with the present invention, the distortion correction signal is generated by using a reference voltage which is set to a voltage corresponding to the center position on the screen, so that the bottom of the center of the distortion correction signal (parabolic wave) constantly coincides the center position of the screen. Accordingly, necessity of readjustment for the side pincushion distortion is unnecessary, and an adjustment process becomes remarkably easy even if the center of the amplitude of the vertical sawtooth wave is shifted from the center of the screen after the adjustment for distortion has been conducted once.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A distortion correcting circuit comprising:
    comparing means for comparing an amplitude of a sawtooth wave signal used for a vertical sweep (termed "vertical sawtooth wave") with one predetermined reference level or a plurality of predetermined reference levels to detect which part of a screen in a vertical sweeping direction a currently sweeping position is located;
    amplifying means for adjusting an amplitude of a side pincushion distortion correction signal generated from said vertical sawtooth wave; and
    control means for individually setting a gain for each of partial regions of the screen to said amplifying means on the basis of a detection result by said comparing means.

2. A distortion correcting circuit comprising:
    comparing means for comparing an amplitude of a sawtooth wave signal used for a vertical sweep (termed "vertical sawtooth wave") with a predetermined reference level to detect which of an upper and lower areas of a screen a currently sweeping position is located at; and
    amplifying means for adjusting an amplitude of a side pincushion distortion correction signal generated from said vertical sawtooth wave; and control means for individually setting a gain for each of an upper and lower areas of the screen to said amplifying means on the basis of a detection result by said comparing means.

3. A distortion correcting circuit comprising:
a comparator circuit which receives a sawtooth wave signal used for a vertical sweep (termed "vertical sawtooth wave") and compares an amplitude of said vertical sawtooth wave in a scanning period with one reference level or a plurality of different reference levels, each of which is set respectively to an amplitude value of the vertical sawtooth wave corresponding to each predetermined position of the screen in a vertical sweeping direction;
a variable gain type amplifier circuit which adjusts an amplitude of an output signal from a multiplier circuit for generating a parabolic wave; and
a control circuit which alternatively selects one of a plurality of gains to provide the selected gain to said variable gain type amplifier circuit on the basis of a comparison result by said comparator circuit depending upon which of regions divided by said reference level the amplitude of said vertical sawtooth wave is located, wherein a distortion correction signal is output from said variable gain type amplifier circuit.

4. A distortion correcting circuit comprising:
a comparator circuit which receives a sawtooth wave signal used for a vertical sweep (termed "vertical sawtooth wave") and compares a voltage of said vertical sawtooth wave in a scanning period with a reference voltage which is set to an amplitude of the vertical sawtooth wave corresponding to a center of a screen in a vertical sweeping direction;
a multiplier circuit which receives said vertical sawtooth wave and said reference voltage as inputs and generates a parabolic wave of a difference between the voltage of said vertical sawtooth wave and said reference voltage;
a variable gain type amplifier circuit which adjusts an amplitude of an output signal output from said multiplier circuit; and
a control circuit which provides, on the basis of a comparison result by said comparator circuit, a first and second predetermined gains to said variable gain type amplifier circuit when the voltage of said vertical sawtooth wave signal is lower, and equal to or higher than said reference voltage, respectively, wherein a distortion correction signal is output from said variable gain type amplifier circuit.

5. A distortion correcting circuit comprising:
a comparator circuit which receives a sawtooth wave signal used for a vertical sweep (termed "vertical sawtooth wave") and compares a voltage of said vertical sawtooth wave in a scanning period with a reference voltage which is set to an amplitude of the vertical sawtooth wave corresponding to a center of a screen in a vertical sweeping direction;
a multiplier circuit which generates a parabolic wave of a difference between the voltage of said vertical sawtooth wave and said reference voltage;
a voltage controlled amplifier circuit which receives a control voltage, a gain of said amplifier circuit being changed by said control voltage, and said parabolic wave to amplify the voltage of the said parabolic wave at the gain specified by the control voltage and output the amplified parabolic wave as a distortion correction signal; and a control circuit which provides, on the basis of a comparison result by said comparator circuit, a first predetermined control voltage to said variable gain type amplifier circuit when the voltage of said vertical sawtooth wave signal is lower and provides a second predetermined control voltage to said variable gain type amplifier circuit when the voltage of said vertical sawtooth wave signal is equal to or higher than said reference voltage.

6. A distortion correcting display device comprising:
a display apparatus wherein a horizontal deflection coil provided in said display apparatus is driven with a horizontal deflection current, which is amplitude-modulated with a distortion correction signal having a vertical interval period output from a distortion correcting circuit, said distortion correcting circuit comprising
a comparator circuit which receives a sawtooth wave signal used for a vertical sweep (termed "vertical sawtooth wave") and compares the voltage of said vertical sawtooth wave in a scanning period with a reference level or a plurality of reference levels, each of which is set to an amplitude of the vertical sawtooth wave corresponding to a predetermined vertical position of a screen;
a variable gain type amplifier circuit which amplifies said vertical sawtooth wave; a control circuit which selects one of plurality of predetermined gains depending upon which of regions divided by said reference level the amplitude of said vertical sawtooth wave is located on the basis of a comparison result by said comparator circuit and provides the gain selected to the variable gain type amplifier circuit; and
a multiplier circuit which generates a parabolic wave from an output signal output from said variable gain type amplifier circuit to output said parabolic wave as a distortion correction signal.

7. A distortion correcting circuit comprising:
a comparator circuit which receives a sawtooth wave signal used for a vertical sweep (termed "vertical sawtooth wave") and compares the voltage of said vertical sawtooth wave in a scanning period with a reference voltage which is set to an amplitude of the vertical sawtooth wave corresponding to a central position of a screen in a vertical sweeping direction;
a variable gain type amplifier circuit which receives the sawtooth wave and the reference voltage and amplifies a difference between the sawtooth wave and the reference voltage;
a control circuit which provides, on the basis of a comparison result by said comparator circuit, a first predetermined control voltage to said variable gain type amplifier circuit when the voltage of said vertical sawtooth wave signal is lower and provides a second predetermined control voltage to said variable gain type amplifier circuit when the voltage of said vertical sawtooth wave signal is equal to or higher than said reference voltage; and
a multiplier circuit which receives an output signal from said variable gain type amplifier circuit and generates a parabolic wave from the output signal output from said variable gain type amplifier circuit to output the parabolic wave as a distortion correction signal.

8. A distortion correcting circuit comprising:
a comparator circuit which receives a sawtooth wave signal used for a vertical sweep (termed "vertical sawtooth wave") and compares the voltage of said vertical sawtooth wave in a scanning period with a reference voltage which is set to an amplitude of the vertical sawtooth wave corresponding to a central position of a screen in a vertical sweeping direction;

a variable gain type amplifier circuit which receives the sawtooth wave and the reference voltage and amplifies a difference between the sawtooth wave and the reference voltage;

a control circuit which provides, on the basis of a comparison result by said comparator circuit, a first predetermined control voltage to said variable gain type amplifier circuit when the voltage of said vertical sawtooth wave signal is lower and provides a second predetermined control voltage to said variable gain type amplifier circuit when the voltage of said vertical sawtooth wave signal is equal to or higher than said reference voltage; and a multiplier circuit which receives an output signal from said variable gain type amplifier circuit and generates a parabolic wave from the output signal output from said variable gain type amplifier circuit to output the parabolic wave as a distortion correction signal.

9. The distortion correcting circuit as defined in claim 5 comprising:

a first and second registers for storing therein digital values corresponding to said first and second control voltages;

a selector to which receives the outputs from said first and second registers and a signal indicating the comparison result by said comparator circuit as a selection control signal, selects and outputs output values of the first registers when said comparison result is lower than said reference voltage and selects and outputs output values of the second registers when said comparison result is equal to or higher than said reference voltage; and a digital to analog converter which receives the output signal from said selector and converts the output signal to an analog signal to output said analog signal, wherein the output of said digital to analog converter is fed to said voltage controlled amplifier circuit as a control voltage.

10. The distortion correcting circuit as defined in claim 8 comprising:

a first and second registers for storing therein digital values corresponding to said first and second control voltages;

a selector to which receives the outputs from said first and second registers and a signal indicating the comparison result by said comparator circuit as a selection control signal, selects and outputs output values of the first registers when said comparison result is lower than said reference voltage and selects and outputs output values of the second registers when said comparison result is equal to or higher than said reference voltage; and a digital to analog converter which receives the output signal from said selector and converts the output signal to an analog signal to output said analog signal, wherein the output of said digital to analog converter is fed to said voltage controlled amplifier circuit as a control voltage.

11. The distortion correcting circuit as defined in claim 9 wherein said selector comprising:

a first logical AND circuit which receives an output of said first register and a signal indicating the comparison result by said comparator circuit, and outputs a logical AND of each output bit of said first register and said signal indicating the comparison result;

a second logical AND circuit which receives an output of said second register and a signal which is obtained by inverting the comparison result signal output from said comparator circuit by an inverter, and outputs a logical AND of each output bit of said second register and said reversed comparison result signal; and a logical OR circuit which receives an output of said first logical AND circuit and an output of said second logical AND circuit and outputs a signal representing a logical OR of the output bit of said first logical AND circuit and an output bit of said second logical AND circuit corresponding to said output bit of said first logical AND bit.

12. The distortion correcting circuit as defined in claim 10 wherein said selector comprising:

a first logical AND circuit which receives an output of said first register and a signal indicating the comparison result by said comparator circuit, and outputs a logical AND of each output bit of said first register and said signal indicating the comparison result;

a second logical AND circuit which receives an output of said second register and a signal which is obtained by inverting the comparison result signal output from said comparator circuit by an inverter, and outputs a logical AND of each output bit of said second register and said reversed comparison result signal; and a logical OR circuit which receives an output of said first logical AND circuit and an output of said second logical AND circuit and outputs a signal representing a logical OR of the output bit of said first logical AND circuit and an output bit of said second logical AND circuit corresponding to said output bit of said first logical AND bit.

13. The distortion correcting circuit as defined in claim 7 wherein said multiplier circuit generates said parabolic wave from the difference between said vertical sawtooth wave and said reference voltage, and a signal output from said variable gain type amplifier circuit.

14. The distortion correcting circuit as defined in claim 8 wherein said multiplier circuit generates said parabolic wave from the difference between said vertical sawtooth wave and said reference voltage, and a signal output from said voltage controlled amplifier circuit.

15. A display apparatus comprising a distortion correcting circuit said distortion correcting circuit comprising comparing means for comparing an amplitude of a sawtooth wave signal used for a vertical sweep (termed "vertical sawtooth wave") with one predetermined reference level or a plurality of predetermined reference levels to detect which part of a screen in a vertical sweeping direction a currently sweeping position is located;

amplifying means for adjusting an amplitude of a side pincushion distortion correction signal generated from said vertical sawtooth wave; and control means for individually setting a gain for each of partial regions of the screen to said amplifying means on the basis of a detection result by said comparing means, wherein a horizontal deflection coil provided in said display apparatus is driven with a horizontal deflection current, which is amplitude-modulated with a distortion correction signal having a vertical interval period output from said distortion correcting circuit.

16. A display apparatus comprising the distortion correcting circuit as defined in claim 9 and a non-volatile storage device, wherein values to be set in said first and second registers, which are obtained on an adjustment step in a manufacturing process are stored in said non-volatile storage device; and wherein each value which is stored in said non-volatile storage device is read-out on turning on of said apparatus and is stored in said first and second registers.

* * * * *